(12) United States Patent
Cunningham et al.

(10) Patent No.: US 7,815,436 B2
(45) Date of Patent: Oct. 19, 2010

(54) SURGICAL SIMULATION INTERFACE DEVICE AND METHOD

(75) Inventors: Richard L. Cunningham, Washington, DC (US); Robert F. Cohen, Burtonsville, MD (US); J. Michael Brown, Washington, DC (US); Robert B. Falk, Takoma Park, MD (US)

(73) Assignee: Immersion Corporation, San Jose, CA (US)

( * ) Notice: Subject to any disclaimer, the term of this patent is extended or adjusted under 35 U.S.C. 154(b) by 699 days.

(21) Appl. No.: 09/738,424

(22) Filed: Dec. 15, 2000

(65) Prior Publication Data

US 2001/0016804 A1    Aug. 23, 2001

Related U.S. Application Data

(63) Continuation-in-part of application No. 09/237,969, filed on Jan. 27, 1999, now Pat. No. 6,929,481, which is a continuation-in-part of application No. 08/923,477, filed on Sep. 4, 1997, now Pat. No. 6,106,301.

(60) Provisional application No. 60/025,433, filed on Sep. 4, 1996, provisional application No. 60/072,672, filed on Jan. 28, 1998, provisional application No. 60/105,661, filed on Oct. 26, 1998, provisional application No. 60/116,545, filed on Jan. 21, 1999.

(51) Int. Cl.
    *G09B 23/28* (2006.01)
(52) U.S. Cl. ........................... 434/262; 345/158
(58) Field of Classification Search ............... 434/262, 434/272; 707/3, 2; 345/156, 158, 162
    See application file for complete search history.

(56) References Cited

U.S. PATENT DOCUMENTS

| | | | |
|---|---|---|---|
| 272,833 A | 2/1883 | Goodfellow | |
| 2,972,140 A | 2/1961 | Hirsch | |
| 3,157,853 A | 11/1964 | Hirsch | |
| 3,220,121 A | 11/1965 | Cutler | |
| 3,226,846 A | 1/1966 | Wood | |

(Continued)

FOREIGN PATENT DOCUMENTS

| | | |
|---|---|---|
| DE | 3834-553 A | 4/1990 |
| EP | 169-776 A | 1/1986 |
| EP | 0 349 086 A1 | 1/1990 |
| EP | 0 485 766 | 5/1992 |
| EP | 0 800 804 | 10/1997 |

(Continued)

OTHER PUBLICATIONS

Gunsburg, *This Shot Won't Hurt At All*, Washington Business, Jul. 16, 1998.
Merril, *Virtual and Augmented Reality in Mediicne*, Proceedings of the IEEE, vol. 86, No. 3, Mar. 1998, pp. 471-473.
Hahn et al., *Training Environment of Inferior Vena Caval Filter Placement*, Medicine Meets Virtual Reality, Jan. 1998, pp. 291-296.

(Continued)

*Primary Examiner*—Carl H Layno
*Assistant Examiner*—Frances P Oropeza
(74) *Attorney, Agent, or Firm*—Kilpatrick Stockton LLP

(57) ABSTRACT

An interface device capable of communicating with a computer running a simulation program, such as a surgical simulation program, comprises an instrument capable of being manipulated by a user. The instrument is receivable within an orifice in an instrument receiving member, the instrument receiving member comprising a capture member engageable with the instrument and a sensor to sense a position of the instrument. The position of the instrument is then used by the computer to control a graphic image related to the simulation. In one version, the simulation is a simulation of a surgical instrument insertion procedure, such as an endoscopy procedure.

11 Claims, 21 Drawing Sheets

U.S. PATENT DOCUMENTS

| | | |
|---|---|---|
| 3,304,434 A | 2/1967 | Koster |
| 3,497,668 A | 2/1970 | Hirsch |
| 3,517,446 A | 6/1970 | Corlyon et al. |
| 3,520,060 A | 7/1970 | Crabtree et al. |
| 3,541,541 A | 11/1970 | Engelbart |
| 3,623,064 A | 11/1971 | Kagan |
| 3,748,366 A | 7/1973 | Radar et al. |
| 3,775,865 A | 12/1973 | Rowan |
| D233,238 S | 10/1974 | Reid et al. |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Salisbury, Jr. |
| 4,236,325 A | 12/1980 | Hall et al. |
| 4,262,549 A | 4/1981 | Schwellenbach |
| 4,321,047 A | 3/1982 | Landis |
| 4,333,070 A | 6/1982 | Barnes |
| 4,360,345 A | 11/1982 | Hon |
| 4,409,479 A | 10/1983 | Sprague et al. |
| 4,423,428 A | 12/1983 | Kuwabara et al. |
| D272,833 S | 2/1984 | Van Assche et al. |
| 4,439,162 A | 3/1984 | Blaine |
| 4,459,113 A | 7/1984 | Boscaro Gatti et al. |
| 4,464,117 A | 8/1984 | Foerst |
| 4,484,191 A | 11/1984 | Vavra |
| 4,490,810 A | 12/1984 | Hon |
| 4,513,235 A | 4/1985 | Acklam et al. |
| 4,581,491 A | 4/1986 | Boothroyd |
| 4,599,070 A | 7/1986 | Hladky et al. |
| 4,642,055 A | 2/1987 | Saliterman |
| 4,708,656 A | 11/1987 | de Vries et al. |
| 4,712,101 A | 12/1987 | Culver |
| 4,713,007 A | 12/1987 | Alban |
| 4,726,772 A | 2/1988 | Amplatz |
| 4,767,333 A | 8/1988 | Born |
| 4,773,865 A | 9/1988 | Baldwin |
| 4,789,340 A | 12/1988 | Zikria |
| 4,794,392 A | 12/1988 | Selinko |
| 4,804,328 A | 2/1989 | Barrabee |
| 4,807,158 A | 2/1989 | Blanton et al. |
| 4,867,168 A | 9/1989 | Stoor et al. |
| 4,867,685 A | 9/1989 | Brush et al. |
| 4,879,668 A | 11/1989 | Cline et al. |
| 4,885,565 A | 12/1989 | Embach |
| 4,891,764 A | 1/1990 | McIntosh |
| 4,907,973 A | 3/1990 | Hon |
| 4,930,770 A | 6/1990 | Baker |
| 4,934,694 A | 6/1990 | McIntosh |
| 4,936,862 A | 6/1990 | Walker et al. |
| 4,936,892 A | 6/1990 | Gehring et al. |
| 4,955,654 A | 9/1990 | Tsuchihashi et al. |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,044,956 A | 9/1991 | Behensky et al. |
| 5,077,608 A | 12/1991 | Dubner |
| 5,078,152 A | 1/1992 | Bond et al. |
| 5,086,401 A | 2/1992 | Glassman et al. |
| 5,099,846 A | 3/1992 | Hardy |
| 5,112,228 A | 5/1992 | Zouras |
| 5,130,794 A | 7/1992 | Ritchey |
| 5,137,458 A | 8/1992 | Ungs et al. |
| 5,149,270 A | 9/1992 | McKeown |
| 5,165,897 A | 11/1992 | Johnson |
| 5,175,459 A | 12/1992 | Danial et al. |
| 5,185,561 A | 2/1993 | Good et al. |
| 5,186,695 A | 2/1993 | Mangseth et al. |
| 5,205,289 A | 4/1993 | Hardy et al. |
| 5,212,473 A | 5/1993 | Louis |
| 5,220,260 A | 6/1993 | Schuler |
| 5,222,499 A | 6/1993 | Allen et al. |
| 5,240,417 A | 8/1993 | Smithson et al. |
| 5,261,404 A | 11/1993 | Mick et al. |
| 5,271,290 A | 12/1993 | Fischer |
| 5,273,038 A | 12/1993 | Beavin |
| 5,275,174 A | 1/1994 | Cook |
| 5,283,970 A | 2/1994 | Aigner |
| 5,295,694 A | 3/1994 | Levin |
| 5,299,810 A | 4/1994 | Pierce et al. |
| 5,309,140 A | 5/1994 | Everett, Jr. et al. |
| 5,311,422 A | 5/1994 | Loftin et al. |
| 5,320,326 A | 6/1994 | Ju et al. |
| 5,320,537 A | 6/1994 | Watson et al. |
| 5,320,538 A | 6/1994 | Baum |
| 5,322,441 A | 6/1994 | Lewis et al. |
| 5,333,106 A | 7/1994 | Lanpher et al. |
| 5,334,027 A | 8/1994 | Wherlock |
| 5,338,198 A | 8/1994 | Wu et al. |
| 5,343,871 A | 9/1994 | Bittman et al. |
| 5,354,202 A | 10/1994 | Moncrief et al. |
| 5,376,007 A | 12/1994 | Zirm |
| 5,377,116 A | 12/1994 | Wayne et al. |
| 5,385,474 A | 1/1995 | Brindle |
| 5,389,865 A | 2/1995 | Jacobus et al. |
| 5,391,081 A | 2/1995 | Lampotang et al. |
| 5,403,191 A | 4/1995 | Tuason |
| 5,414,337 A | 5/1995 | Schuler |
| 5,436,622 A | 7/1995 | Gutman et al. |
| 5,437,607 A | 8/1995 | Taylor |
| 5,438,529 A | 8/1995 | Rosenberg et al. |
| 5,451,924 A | 9/1995 | Massimino et al. |
| 5,454,722 A | 10/1995 | Holland et al. |
| 5,459,382 A | 10/1995 | Jacobus et al. |
| 5,466,213 A | 11/1995 | Hogan et al. |
| 5,480,307 A | 1/1996 | Lang et al. |
| 5,482,472 A | 1/1996 | Garoni et al. |
| 5,483,254 A | 1/1996 | Powell |
| 5,483,961 A | 1/1996 | Kelly et al. |
| 5,509,810 A | 4/1996 | Schertz et al. |
| 5,510,832 A | 4/1996 | Garcia |
| 5,513,992 A | 5/1996 | Refait |
| 5,518,406 A | 5/1996 | Waters |
| 5,531,227 A | 7/1996 | Schneider |
| 5,546,943 A | 8/1996 | Gould |
| 5,547,382 A | 8/1996 | Yamasaki et al. |
| 5,552,995 A | 9/1996 | Sebastian |
| 5,559,412 A | 9/1996 | Schuler |
| 5,575,761 A | 11/1996 | Hajianpour |
| 5,576,727 A | 11/1996 | Rosenberg et al. |
| 5,589,854 A | 12/1996 | Tsai |
| 5,593,306 A | 1/1997 | Kohnke |
| 5,609,485 A | 3/1997 | Bergman et al. |
| 5,623,582 A | 4/1997 | Rosenberg |
| 5,629,594 A | 5/1997 | Jacobus et al. |
| 5,666,138 A | 9/1997 | Culver |
| 5,682,886 A | 11/1997 | Delp et al. |
| 5,687,259 A | 11/1997 | Linford |
| 5,690,582 A | 11/1997 | Ulrich et al. |
| 5,691,898 A | 11/1997 | Rosenberg et al. |
| 5,701,140 A | 12/1997 | Rosenberg et al. |
| 5,704,791 A | 1/1998 | Gillio |
| 5,721,566 A | 2/1998 | Rosenberg et al. |
| D392,878 S | 3/1998 | Nordstrom et al. |
| 5,722,836 A | 3/1998 | Younker |
| 5,724,264 A | 3/1998 | Rosenberg et al. |
| 5,731,804 A | 3/1998 | Rosenberg |
| 5,734,373 A | 3/1998 | Rosenberg et al. |
| 5,739,811 A | 4/1998 | Rosenberg et al. |
| 5,740,802 A | 4/1998 | Nafis et al. |
| 5,742,278 A | 4/1998 | Chen et al. |
| 5,746,753 A | 5/1998 | Sullivan et al. |

| | | | |
|---|---|---|---|
| 5,755,577 A | 5/1998 | Gillio | |
| 5,766,016 A | 6/1998 | Sinclair et al. | |
| 5,767,839 A | 6/1998 | Rosenberg | |
| 5,768,134 A | 6/1998 | Swaelens et al. | |
| 5,769,640 A | 6/1998 | Jacobus et al. | |
| 5,772,836 A | 6/1998 | Ogawa | |
| 5,785,630 A | 7/1998 | Bobick et al. | |
| 5,788,701 A * | 8/1998 | McCue | 606/88 |
| 5,791,908 A | 8/1998 | Gillio | |
| 5,800,177 A | 9/1998 | Gillio | |
| 5,800,178 A | 9/1998 | Gillio | |
| 5,800,179 A * | 9/1998 | Bailey | 434/262 |
| 5,805,140 A * | 9/1998 | Rosenberg et al. | 345/161 |
| 5,807,115 A | 9/1998 | Hu | |
| 5,817,107 A | 10/1998 | Schaller | |
| 5,820,600 A | 10/1998 | Carlson et al. | |
| 5,821,920 A | 10/1998 | Rosenberg et al. | |
| 5,825,308 A | 10/1998 | Rosenberg | |
| 5,825,941 A | 10/1998 | Linford et al. | |
| 5,828,197 A * | 10/1998 | Martin et al. | 318/567 |
| 5,853,292 A | 12/1998 | Eggert et al. | |
| 5,855,583 A | 1/1999 | Wang et al. | |
| 5,873,731 A | 2/1999 | Prendergast | |
| 5,873,732 A | 2/1999 | Hasson | |
| 5,880,976 A | 3/1999 | DiGioia, III et al. | |
| 5,882,206 A | 3/1999 | Gillio | |
| 5,882,207 A | 3/1999 | Lampotang et al. | |
| 5,889,670 A | 3/1999 | Schuler et al. | |
| 5,890,908 A | 4/1999 | Lampotang et al. | |
| 5,891,131 A | 4/1999 | Rajan et al. | |
| 5,909,380 A | 6/1999 | Dubois et al. | |
| 5,941,710 A | 8/1999 | Lampotang et al. | |
| 5,945,056 A | 8/1999 | Day et al. | |
| 5,947,743 A | 9/1999 | Hasson | |
| 5,950,629 A * | 9/1999 | Taylor et al. | 128/897 |
| 5,951,301 A | 9/1999 | Younker | |
| 5,956,040 A | 9/1999 | Asano et al. | |
| 5,967,790 A | 10/1999 | Strover et al. | |
| 5,995,738 A | 11/1999 | DiGioia, III et al. | |
| 6,057,828 A | 5/2000 | Rosenberg et al. | |
| 6,062,865 A | 5/2000 | Bailey | |
| 6,086,528 A | 7/2000 | Adair | |
| 6,104,382 A | 8/2000 | Martin et al. | |
| 6,111,577 A | 8/2000 | Zilles et al. | |
| 6,160,489 A | 12/2000 | Perry et al. | |
| 6,223,100 B1 | 4/2001 | Green | |
| 6,377,011 B1 * | 4/2002 | Ben-Ur | 318/566 |
| 6,422,941 B1 | 7/2002 | Thorner et al. | |
| 6,876,891 B1 | 4/2005 | Schuler et al. | |

FOREIGN PATENT DOCUMENTS

| | | |
|---|---|---|
| EP | 0 908 836 | 4/1999 |
| EP | 0 970 714 A2 | 1/2000 |
| FR | 2 592 514 | 7/1987 |
| GB | 2 252 656 A | 8/1992 |
| GB | 2 288 686 A | 10/1995 |
| JP | H2-185278 | 7/1990 |
| JP | H4-8381 | 1/1992 |
| JP | H5-192449 | 8/1993 |
| JP | H7-24147 | 1/1995 |
| SU | 1124-372 A | 11/1984 |
| SU | 1335-994 A | 11/1987 |
| SU | 1732371 A1 | 5/1992 |
| WO | WO 93/08517 | 4/1993 |
| WO | WO 95/02233 | 1/1995 |
| WO | WO 95/02801 | 1/1995 |
| WO | WO 96/16397 | 5/1996 |
| WO | WO 96/28800 | 9/1996 |
| WO | WO 98/03954 A1 | 1/1998 |
| WO | WO 98/10387 | 3/1998 |
| WO | WO 98/58308 | 12/1998 |
| WO | WO 99/25536 | 5/1999 |
| WO | WO 99/38141 | 7/1999 |
| WO | 99/39317 | 8/1999 |

OTHER PUBLICATIONS

Immersion Human Interface Corporation, *Programmer's Technical Reference Manual: Immersion Probe and Personal Digitizer*, May 1994, pp. 1-80.

Kegier, *Surgeons Turn to Surgical Simulation Via Virtual Reality to Practice New Procedures*, Laproscopy News, Nov. 1994, pp. 6-8.

Merril et al., *Cyber Surgery: Cutting Costs, Sewing Benefits*, Virtual Reality Special Report, Summer, 1994, pp. 39-42.

Hon, *Realistic Medical Simulations*, Virtual Reality World, Jul./Aug. 1994, p. 59-62.

Satava, *The Role of Virtual Reality in Medicine of the 21st Century*, Virtual Reality Systems, vol. 1, No. 2, Fall 1993, pp. 64-67.

Merril et al. *Virtual Heart Surgery: Trade Show and Medical Education*, Virtual Reality World, Jul./Aug. 1994, pp. 55-57.

Merril et al., *Virtual Reality for Tradeshows and Individual Physician Training*, Virtual Reality Systems, Spring 1994, pp. 40-44.

Rosenberg, *Medical Applications of Virtual Reality*, Virtual Reality Systems, vol. 1, No. 3, Spring 1994, pp. 48-50.

Merril et al., *Surgical Simulation Using Virtual Reality Technology: Design, Implementation, and Implications* , Surgical Technology International III, Fall 1994, pp. 53-60.

Taubes, *Surgery in Cyberspace*, Discovery, Dec. 1994, pp. 85-94.

Krueger et al., *The Responsive Workbench*, IEEE Computer Graphics and Applications, May 1994, pp. 12-15.

Jackson et al., *Force Feedback and Medical Simulation*, Interactive Technology and the New Paradigm for Healthcare, Jan. 1995, pp. 147-151.

Cover et al., *Interactively Deformable Models for Surgery Simulation*, IEEE Computer Graphics & Applications, vol. 13, No. 6, Nov. 1993, pp. 68-75.

Okie, *Out of Body Medicine*, Washington Post, Nov. 5, 1996, pp. 12-14, 17.

Smith, *Scanning the Technology*, Proceeding of IEEE, vol. 86, No. 3, Mar. 1998, pp. 474-478.

Dawson et al., *The Imperative for Medical Simulation*, Proceeding of IEEE, vol. 86, No. 3, Mar. 1998, pp. 479-483.

Satava et al., *Current and Future Applications of Virtual Reality for Medicine*, Proceedings of IEEE, vol. 86, No. 3, Mar. 1998, pp. 484-489.

Bro-Nielsen, *Finite Element Modeling in Surgery Simulation*, Proceedings of IEEE, vol. 86, No. 3, Mar. 1998, pp. 490-503.

Ackerman, *The Visible Human Project*, Proceedings of IEEE, vol. 86, No. 3, Mar. 1998, pp. 504-511.

Delingette, *Toward Realistic Soft Tissue Modeling in Medical Simulation*, Proceedings of IEEE, vol. 86, Mar. 1998, pp. 512-523.

Chan et al., *Force Feedback for Surgical Simulation*, Proceedings of IEEE, vol. 86, No. 3, Mar. 1998, pp. 524-530.

Soferman et al., *Advanced Graphics Behind Medical Virtual Reality: Evolution of Algorithms, Hardware, and Software Interfaces*, Proceedings of IEEE, vol. 86, No. 3, Mar. 1998, pp. 531-554.

Shahidi et al., *Clinical Applications of Three Dimensional Rendering of Medical Data Sets*, Proceedings of IEEE, vol. 86, No. 3, Mar. 1998, pp. 555-568.

Hill et al., *Telepresence Technology in Medicine: Principles and Applications*, Proceedings of IEEE, vol. 86, No. 3, Mar. 1998, pp. 569-580.

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., 'Model-X Force-Reflecting-Hand-Controller," NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE Vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al, "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," Presence, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control:* vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," $2^{nd}$ Edition; McGraw-Hill, ISBN 0-07-050167-X. pp. 41-202, 1994.

"Cyberman Technical Specification," *LogItech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/Issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance In Telepresence Tasks," *Ph.D. Dissertation*, Stanford University, Jun. 1994.

Westwood, J.D. et al., "Training Environment for Inferior Vena Caval Filter Placement," article, Medicine Meets Virtual Reality, Jan. 28-31, 1998, San Diego, California.

* cited by examiner

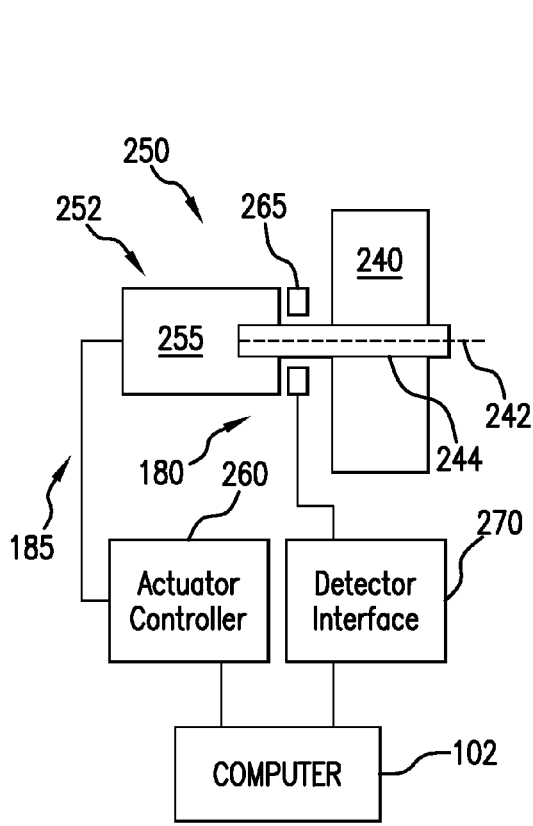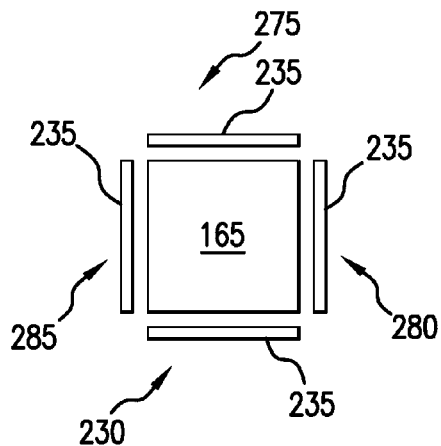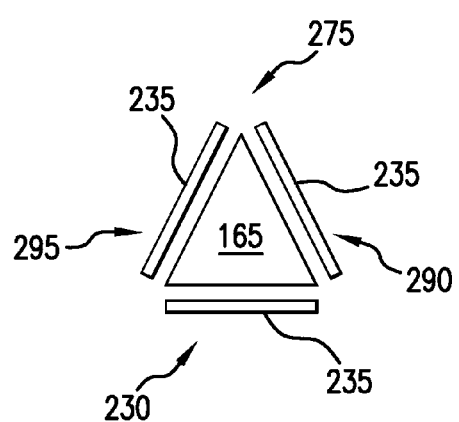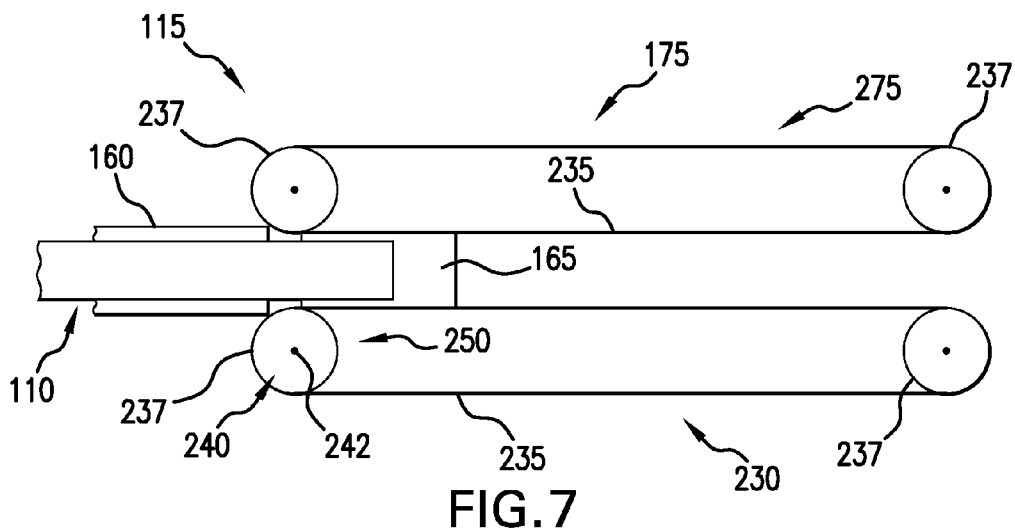

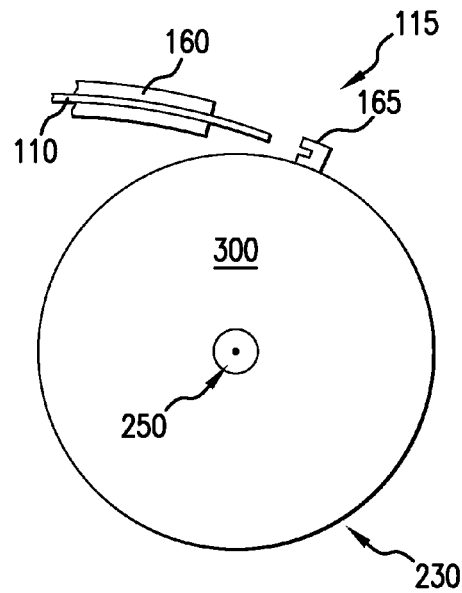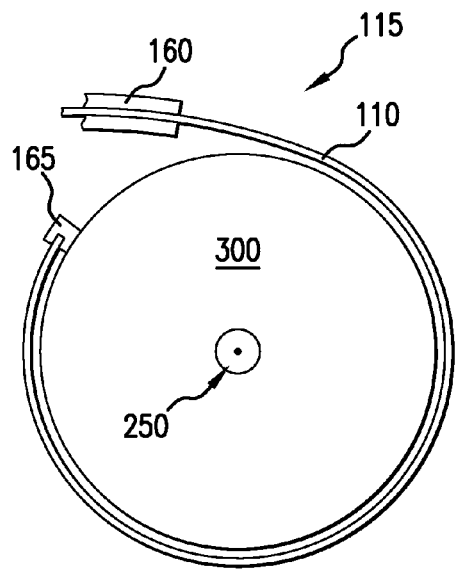
FIG.9aFIG.9b
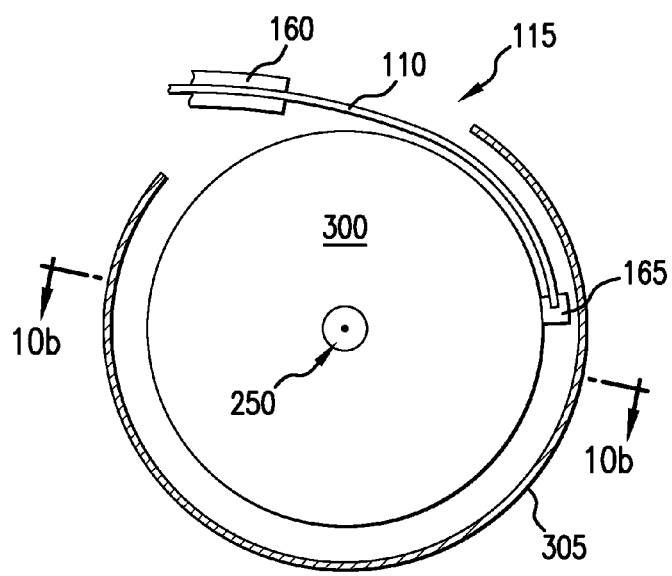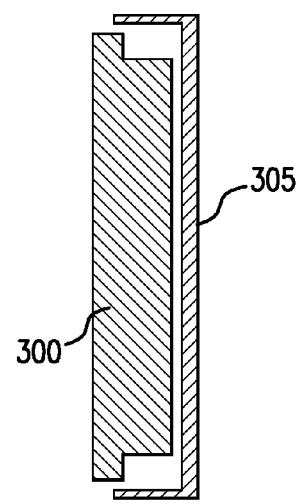
FIG.10aFIG.10b

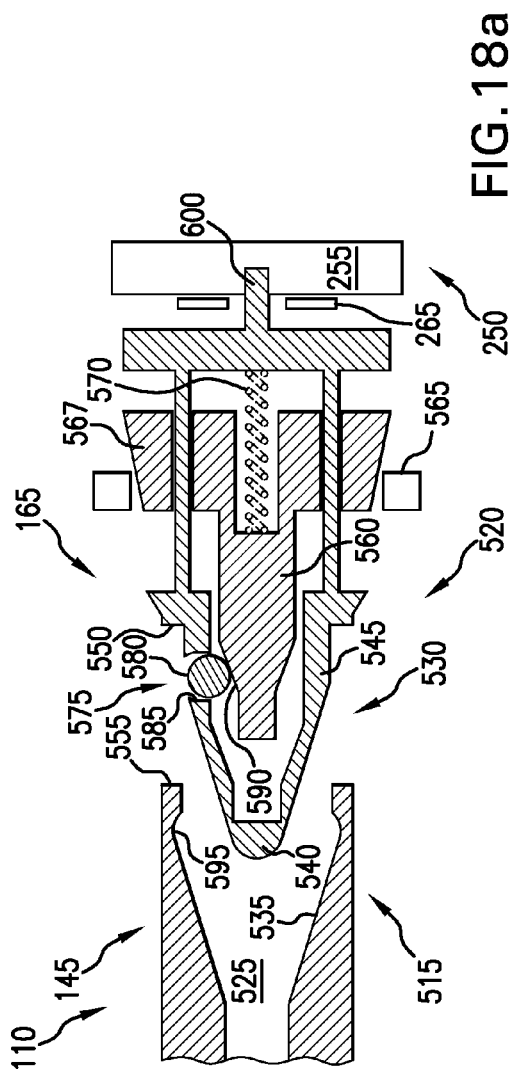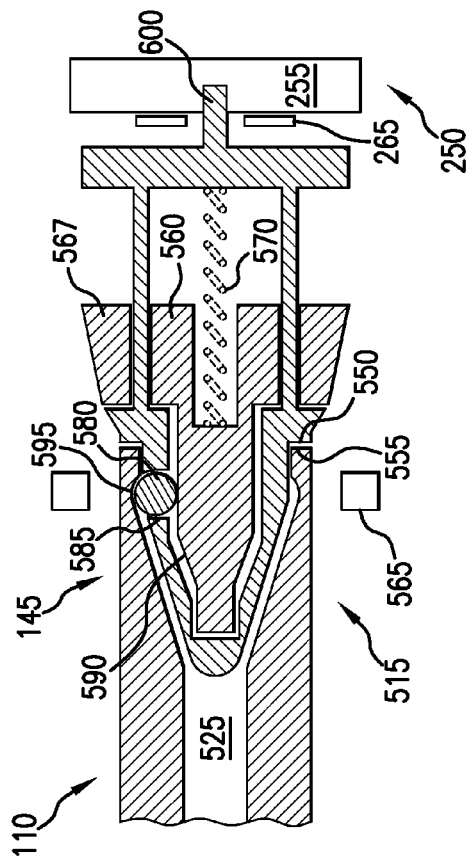
FIG. 18a
FIG. 18b

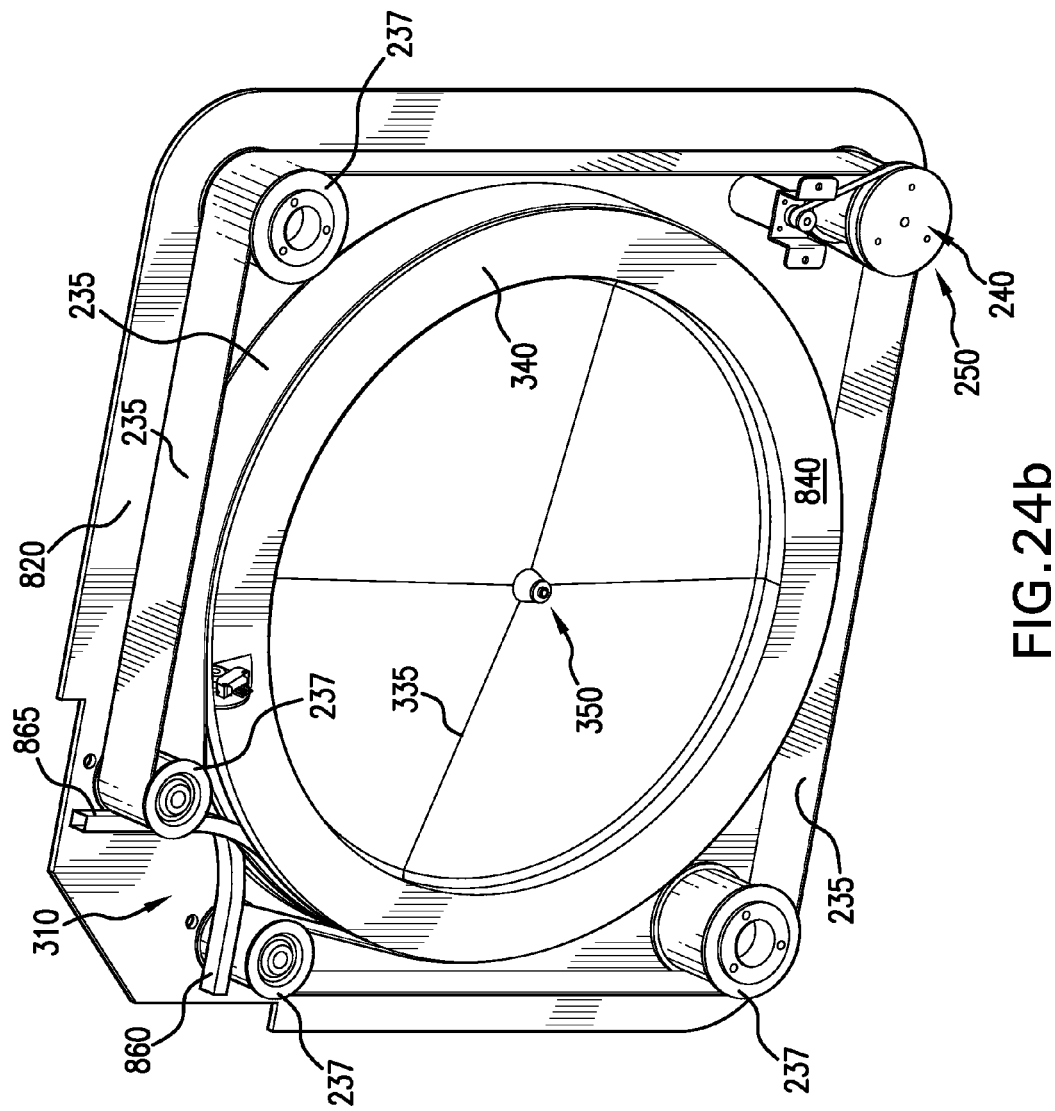

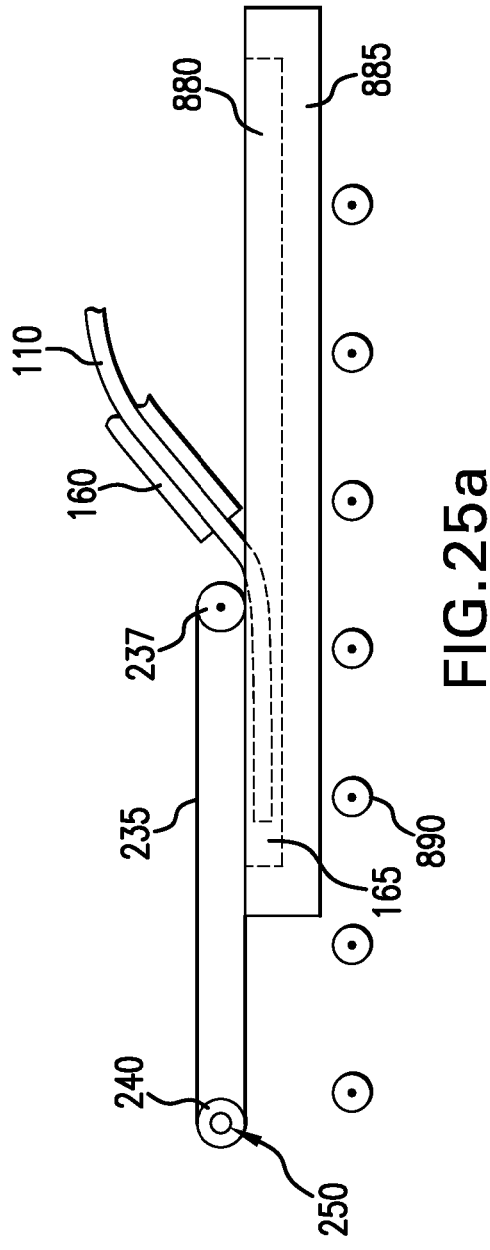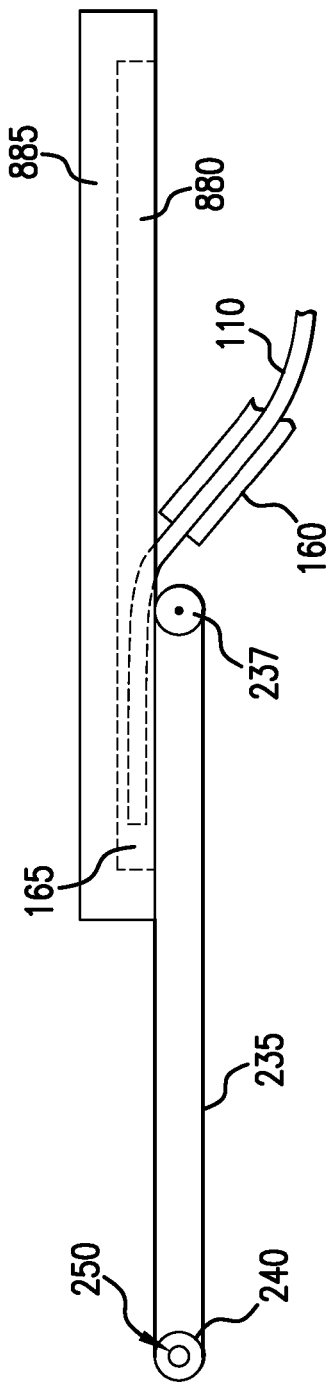
FIG. 25a
FIG. 25b

SURGICAL SIMULATION INTERFACE DEVICE AND METHOD

CROSS-REFERENCE TO RELATED APPLICATIONS

This application is a continuation-in-part of U.S. patent application Ser. No. 09/237,969, filed on Jan. 27, 1999 and entitled "Interface Device and Method for Interfacing Instruments to Medical Procedure Simulation Systems", now U.S. Pat. No. 6,929,481 which is a continuation-in-part of U.S. patent application Ser. No. 08/923,477, filed on Sep. 4, 1997, now U.S. Pat. No. 6,106,301, which claims priority from U.S. Provisional Application Ser. No. 60/025,433, filed on Sep. 4, 1996, said U.S. patent application Ser. No. 09/237,969 also claiming priority from U.S. Provisional Application Ser. No. 60/072,672, filed on Jan. 28, 1998, U.S. Provisional Application Ser. No. 60/105,661, filed on Oct. 26, 1998, and U.S. Provisional Application Ser. No. 60/116,545, filed Jan. 21, 1999, all of these disclosures being incorporated herein by reference in their entireties.

BACKGROUND

The present invention relates to a computer peripheral, such as a surgical instrument, capable of interfacing with a computer, such as a computer for performing a surgical simulation.

Medical practitioners commonly insert surgical instruments into living beings to perform diagnostic and/or treatment procedures. For example, an endoscope equipped at its end with a fiber optic video camera may be inserted through an orifice, such as a mouth, nose, or anus, to transmit visual images of internal tissues in a patient. The images may be provided on a display, such as a video monitor, to the medical practitioner who uses the visual image to direct the endoscope and to visually inspect for internal abnormalities indicative of diseased or potentially diseased states. In another procedure, an endovascular device can be inserted into the vasculature of a patient to, for example, perform angioplasty or place leads in or around the heart. Endoscopic and endovascular procedures are minimally invasive and are highly useful in providing detailed information on the health of an individual and in treating the individual, when indicated, thereby reducing the need for more invasive surgery.

However, the usefulness of instrument insertion procedures is dependent on the skill of the medical practitioner who is performing the procedure. For example, during colonoscopy, an endoscopic tube may be inserted through the rectum and into the colon to an insertion depth of several centimeters, often over 150 centimeters. Without proper skill and training, the medical practitioner may cause pain or discomfort to the patient, which may make it difficult to perform a thorough examination and may lessen the likelihood of the patient returning for follow-up visits or for later routine examinations. During bronchoscopy, a practitioner lacking proper skill may have difficulty properly navigating the bronchial passageways, manipulating biopsy instruments, or administering lidocaine while inserting a bronchoscope. In endovascular procedures, highly coordinated hand movements are necessary to safely and effectively guide and manipulate an endovascular device. These skills are best learned through iterative practice.

To reduce the amount of training that occurs on an actual patient, surgical instrument insertion procedures are often practiced by simulating the procedure. Cadavers have been used to train medical practitioners, but the costs, lack of availability, and health concerns limit their desirability. Additionally, in some situations, the cadaver does not ideally simulate the internal environment of a living being. Non-human animal testing is also undesirable for animal rights reasons and often for anatomical reasons. Previous computer simulations of instrument insertion procedures also have disadvantages. For example, the force sensations of the procedures are often not simulated and the forces needed to manipulate the instrument are often not authentic. Also, the insertion and/or removal of an instrument into an orifice has often been tedious and unrealistic or has been omitted from the simulation. In addition, it has been difficult to realistically simulate the insertion of long instruments, particularly while reducing the size of the simulator.

Thus, it is desirable to authentically simulate a procedure, such as a surgical instrument insertion procedure. It is also desirable to provide realistic force feedback during a simulated procedure. It is further desirable to reduce the size of a surgical simulator and to allow for the realistic simulation of the insertion of a long instrument. Additionally, it is desirable to provide a realistic simulation of an instrument's insertion into and/or removal from an orifice.

SUMMARY

The present invention satisfies these needs. In one aspect of the invention, an interface device capable of communicating with a computer running a simulation program comprises an instrument capable of being manipulated by a user, an instrument receiving member comprising an orifice capable of receiving the instrument, the instrument receiving member comprising a capture member engageable with the instrument and movable in an at least partially arcuate path in the instrument receiving member, and a sensor in the instrument receiving member to sense a position of the instrument and to generate a position signal related to the position, whereby the position signal may be used by the computer to control a graphic image.

In another aspect of the invention, an interface device capable of communicating with a computer running a simulation program comprises an instrument capable of being manipulated by a user, an instrument receiving member comprising an orifice capable of receiving the instrument, the instrument receiving member comprising a belt capable of contacting the instrument, and a sensor in the instrument receiving member to sense a position of the instrument and to generate a position signal related to the position, whereby the position signal may be used by the computer to control a graphic image.

In another aspect of the invention, an interface device capable of communicating with a computer running a simulation program comprises an instrument capable of being manipulated by a user, an instrument receiving member comprising an orifice capable of receiving the instrument, a position detector to generate a position signal related to a position of the instrument in the instrument receiving member, and means for forcing the instrument and reducing undesired bending of the instrument, whereby the position signal may be used by the computer to control a graphic image and to generate the force signal to force the instrument.

In another aspect of the invention, an interface device capable of communicating with a computer running a simulation program comprises an instrument capable of being manipulated by a user, the instrument having a longitudinal axis, an instrument receiving member comprising an orifice capable of receiving the instrument, a sensor in the instrument receiving member to sense a rotational position of the instrument about its longitudinal axis and to generate a position signal related to the rotational position, and an actuator coupled to the instrument to provide rotational force feedback to the user by rotating the instrument about its longitudinal axis in response to a force signal from the computer, whereby the position signal may be used by the computer to control a graphic image.

In another aspect of the invention, an interface device capable of communicating with a computer running a simulation program comprises an instrument capable of being manipulated by a user, the instrument comprising a distal end, an instrument receiving member comprising an orifice capable of receiving the instrument, the instrument receiving member comprising a capture member comprising a locking mechanism to lock the distal end of the instrument to the capture member, and a sensor in the instrument receiving member to sense a position of the instrument and to generate a position signal related to the position, whereby the position signal may be used by the computer to control a graphic image.

In another aspect of the invention, an interface device capable of communicating with a computer running a simulation program comprises an instrument capable of being manipulated by a user, an instrument receiving member comprising a first orifice capable of receiving the instrument and a second orifice capable of receiving the instrument or a different instrument, the instrument receiving member comprising a first capture member associated with the first orifice and engageable with the instrument and a second capture member associated with the second orifice and engageable with the instrument or the different instrument, and a sensor in the instrument receiving member to sense a position of the instrument and to generate a position signal related to the position, whereby the position signal may be used by the computer to control a graphic image.

In another aspect of the invention, an interface device capable of communicating with a computer running a simulation program comprises an instrument capable of being manipulated by a user, a handle on the instrument, the handle comprising a sensor to detect the presence or absence of a body part of the user and generating a signal related thereto, whereby the signal may be used by the computer to control a graphic image.

In another aspect of the invention, a method of interfacing a user with a computer running a simulation program comprises inserting an instrument into an orifice, detecting a position of the instrument, providing visual feedback to the user based on the detected position, and providing rotational force feedback to the user based on the detected position.

In another aspect of the invention, a method of interfacing a user with a computer running a simulation program comprises inserting an instrument into an orifice, the instrument following an at least partially arcuate path, detecting a position of the instrument, and providing force feedback to the user through the instrument based on the detected position.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

FIG. 6 is a schematic illustration of a forcing and sensing mechanism;

FIG. 7 is a schematic sectional side view of another version of an interface device;

FIGS. 8a and 8b are schematic sectional end views of versions of an interface device;

FIGS. 9a and 9b are schematic sectional side views of versions of an interface device having a wheel;

FIGS. 10a and 10b are schematic sectional side views of a version of an interface device having a wheel and a fender;

FIGS. 18a and 18b are schematic sectional side views of another version of a capture member;

FIG. 24b is a schematic of a multi-groove wheel in a housing of an interface device;

FIGS. 25a and 25b are schematic sectional side views of other versions of an interface device.

DESCRIPTION

The present invention relates to computer simulations and more particularly to computer simulations involving force feedback. Although the process is illustrated in the context of surgical simulations, the present invention can be used in other simulation and computer interactive processes and should not be limited to the examples provided herein.

Figure 1:
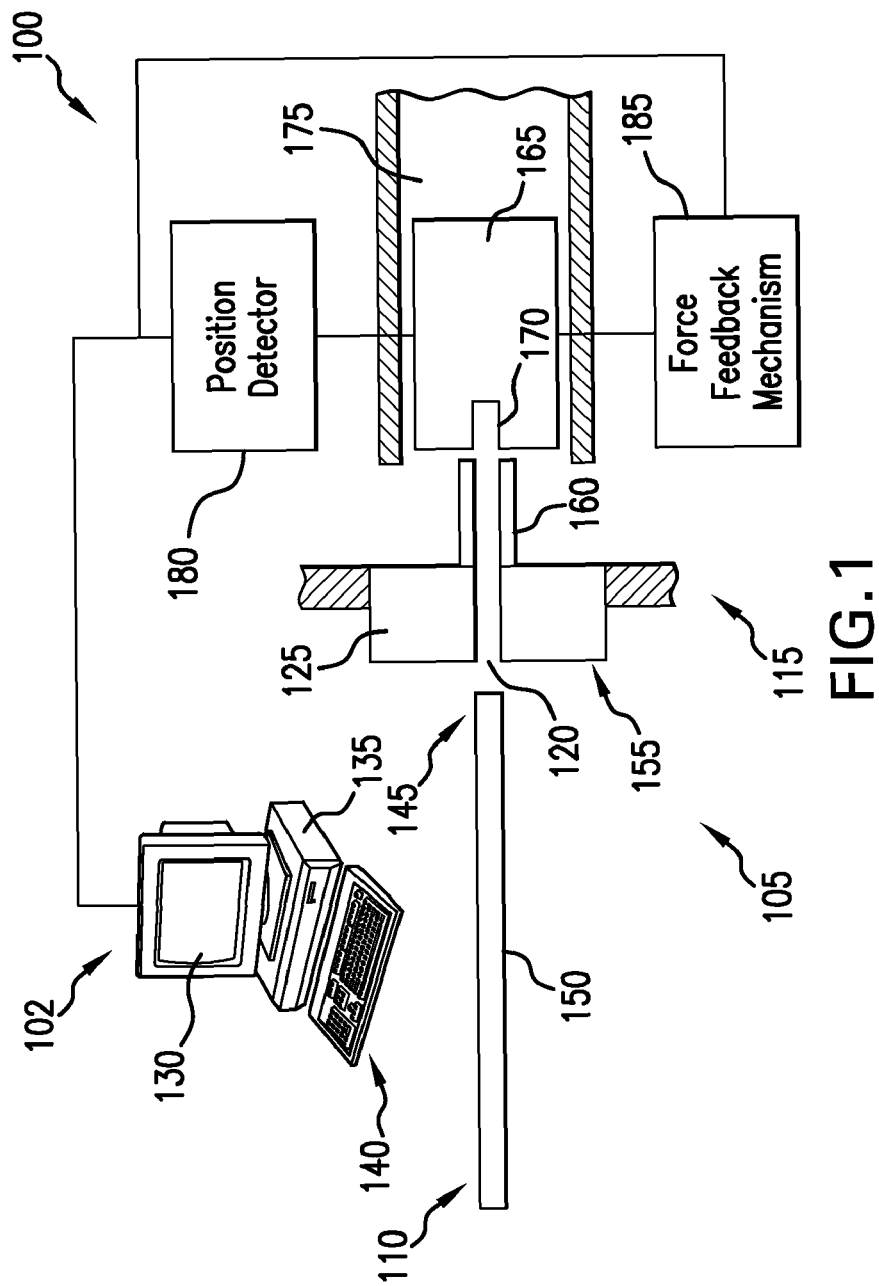
FIG. 1 is a schematic view of a simulation system of the present invention.

A system 100 for simulating a surgical instrument insertion procedure is shown in FIG. 1. The system 100 comprises a computer 102 or other processor or simulator, and an interface device 110. In the version shown, the interface device 105 comprises an instrument 110, such as a surgical instrument, and an instrument receiving member 115. To simulate a surgical procedure, for example, the instrument 110 is inserted into an orifice 120 in the instrument receiving member 115. The orifice 120 may be shaped and sized to simulate a patient orifice, such as a nostril, mouth, anus, or trocar-created opening, in a living being and may be directly on the instrument receiving member 115 or may be within an entry member 125 positionable on, in or adjacent to the instrument receiving member 115. The position of the instrument 110 in the instrument receiving member 115 is detected and transmitted to the computer 102 which may comprise a display 130, a central processing unit 135 comprising one or more processors, memories and accompanying hardware, and one or more data entry devices 140, such as a keyboard and mouse. The computer 102 may comprise a conventional or commercially available workstation, such as those manufactured by IBM, Dell or Silicon Graphics, Inc., and is capable of running computer code related to a surgical simulation.

The system 100 provides an authentic simulation of an instrument insertion procedure, such as a surgical instrument insertion procedure. In one version, the simulated procedure may be an endoscopic procedure such as colonoscopy, bronchoscopy, laryngoscopy, gastroscopy, sigmoidoscopy, arthroscopy, laparoscopy, cystoscopy, or ureteroscopy. In this version, the image provided on display 130 simulates a video image that would be transmitted by an actual endoscope inserted in a patient. The instrument receiving member 115 detects the position of the distal or distal end 145 of an endoscope 150 and reports the position to the computer 102 which then generates, according to program code, an image to be displayed that corresponds to the detected position and that changes as the position of the endoscope 150 changes. In another version, the system 100 may be used to simulate an endovascular procedure, and the image displayed may simulate a radiographic, such as a fluoroscopic, image that would be viewed by a medical practitioner during the endovascular procedure. Alternatively, the system 100 may be used to simulate other surgical procedures, such as a gastic tube insertion procedures, a gynecological insertion procedure, or the like. In these simulated procedures, the medical practitioner grasps an instrument 110, inserts the instrument 110 into an orifice 120, and views images much like the images that would be viewed during an actual surgical procedure. The computer 102 houses and/or runs programmable code designed to simulate a surgical procedure. A version of a computerized simulation system is disclosed in International Publication Number WO 96/28800, published Sep. 19, 1996 and entitled "Computer Based Medical Procedure Simulation System", in U.S. Pat. No. 6,106,301, and in U.S. patent application Ser. No. 09/237,969, all of which are incorporated herein by reference in their entireties.

The instrument 110 may be an actual or a mock surgical instrument that is capable of being manipulated by a user. For example, as shown in FIG. 1, the instrument 110 comprises an endoscope 150 which may be a commercially available endoscope, a mock endoscope having a design similar in some aspects to a commercially available or standard endoscope, or another endoscope or mock endoscope. Alternatively, the instrument 110 may comprise one or more actual or mock endovascular devices, such as one or more actual or mock guidewires, catheters, sheaths, stylets, or heart pacing leads, or other actual or mock surgical instruments, such as a stent deployment tube or a trocar. Alternatively, the instrument 110 may be an instrument other than a surgical instrument. For example, the instrument 110 may be or may comprise a part of a human body, such as a finger or an arm or other appendage, insertable into a body or other orifice, or the instrument 110 may comprise a game piece, such as a pool cue, that is insertable into an orifice to simulate a game, such as a pool game, or any type of instrument that is used to directly or indirectly control a graphical image on a display 130.

In one version, the entry member 125 may include an exterior surface 155 that simulates the look and texture of the area of a body immediately surrounding the orifice being simulated. For example, the exterior surface 155 may comprise the contour of a face when the orifice is intended to represent a nostril or a mouth, the contour of buttocks when the orifice represents an anus, or a contour representing the area around an opening created by a scalpel or a trocar. The entry member 125 may also comprise a guide passageway 160 to guide the instrument 110 from the orifice 120 to a position in the instrument receiving member 115. The guide passageway 160 may be unitary with the entry member 125 or may be a separate tube or passageway attached or adjacent to the entry member 125.

The instrument 110 may be permanently attached within the instrument receiving member 115 or may be insertable into and/or removable therefrom. In the version shown in FIG. 1, the instrument 110 is both insertable into and removable from the instrument receiving member 115 to provide a more realistic simulation of the surgical instrument insertion procedure. However, to simulate procedures that do not insert and/or remove the instrument 110, to simplify the manufacture of the system, or to simulate a portion of a procedure, the instrument 110 may be permanently fixed within the instrument receiving member 115. As the instrument 110 is inserted through the orifice 120 and guide passageway 160, the distal end 145 of the instrument 110 may be received by a capture member 165, for example by being fixedly received in an opening 170 in the capture member 165. The capture member 165 is capable of automatically or manually being permanently or releasably engaged by and attached to the instrument 110. When attached, the instrument 110 and the capture member 165 are displaceable together in an insertion direction, for example by being displaceable within or along path 175 within the instrument receiving member 115. The amount of displacement is detected by a position detector 180 in the instrument receiving member 115 and communicated to the computer 102, which correlates the displacement with an insertion depth and which displays to the medical practitioner an image associated with the insertion depth. For example, the position detector 180 may comprise a sensor to sense a position of the instrument 110 and to generate a position signal related to the position, whereby the position signal may be used by the computer 102 to control a graphic image on the display 130.

The instrument receiving member 115 may also comprise a force feedback mechanism 185 to provide to the medical practitioner a kinesthetic and/or tactile haptic feedback or sensation to simulate the forces felt during a surgical procedure or to provide other types of feedback to the practitioner. The force feedback mechanism 185 may be passive, for example comprising an actuator, such as a braking mechanism, that increases the insertion or removal force necessary to move the capture member 165, or may be active, for example comprising an actuator, such as a motor, capable of applying a force to the capture member 165 that is transmitted to the medical practitioner. The force feedback mechanism 185 may simulate the instrument 110 encountering an obstruction by preventing or making more difficult the forward movement of the capture member 165, may simulate a tortuous path by applying forces simulating the friction forces associated with turns, may simulate a cough of a patient by vibrating the capture member 165, or may simulate other force or tactile sensations. For example, the position detector 180 may generate a position signal related to the position of the instrument 110, as discussed above, and the position signal may be used by the computer 102 to generate a force signal to control the application of force feedback by the force feedback mechanism 185.

Figure 2A:
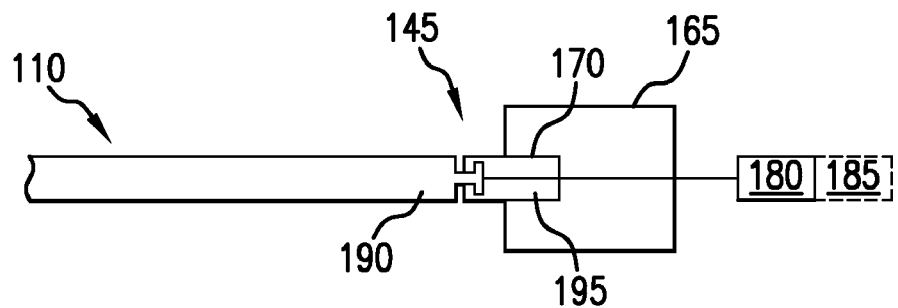
FIGS. 2a through 2c are schematic sectional side views of versions of mechanisms for detecting rotation of an instrument in a capture member.
Figure 2B:
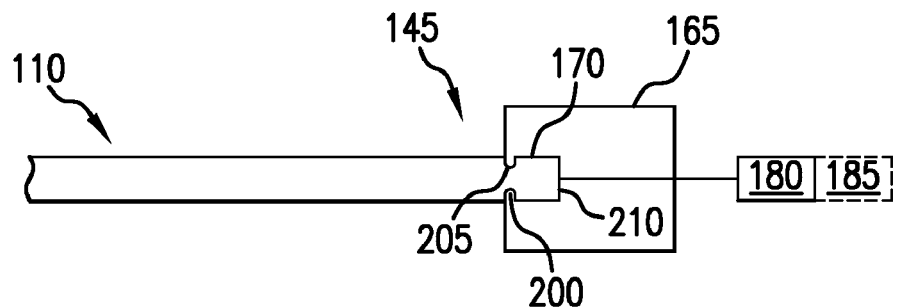
Figure 2C:
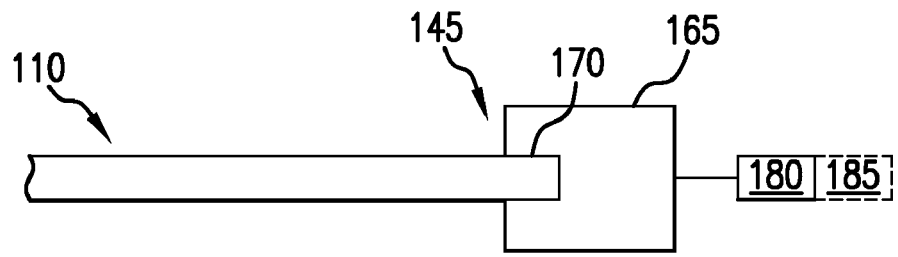

The system 100 may also simulate the twisting of an instrument, such as the twisting of a surgical instrument in a body. In an actual surgical procedure, the medical practitioner applies torque to the instrument 110 in order to rotate the instrument 110 to steer the distal end 145 or to visually view a desired region in a patient. To simulate this, the rotation at the distal end 145 caused by the torque of the instrument 110 is detected and reported to the computer 102 which adjusts the visual image accordingly. FIGS. 2a through 2c show different versions of instrument distal ends 145 and capture members 165 that may be used to detect the rotation. In the version of FIG. 2a, the instrument 110 comprises a body 190 and a distal member 195. The body 190 and the distal member 195 are rotatably coupled to one another so that the distal member 195 may rotate relative to the body 190 about its longitudinal axis. The distal member 195 may then be non-rotatably captured in capture member 165, such as by frictional engagement or locking engagement, and the capture member 165 may be non-rotatable within the path 175. The position detector 180 may then measure the rotation between the body 190 and the distal member 195. In the version of FIG. 2b, the distal end 145 of the instrument 110 may be rotatable within the capture member 165. For example, the opening 170 into the capture member 165 may comprise a deflectable lip 200 that is receivable in a groove 205 extending around the instrument 110. In this version, the position detector 180 measures the relative rotation between the distal tip 210 of the instrument 110 and the capture member 165. In the version of FIG. 2c, the distal end 145 of the instrument 110 is non-rotatably captured within the capture member 165 and the capture member is rotatably mounted within the path 175. The position detector then measures the rotational position of the capture member 165 in the path 175. In any of these versions, the force feedback mechanism 185 may also act on the capture member 165 and/or the distal end 145 of the instrument 110 to provide sensations associated with the twisting of the instrument 110. For example, in simulated narrow passageways, the force required to twist the instrument 110 may be made greater than when simulating insertion in larger passageways.

Figure 3:
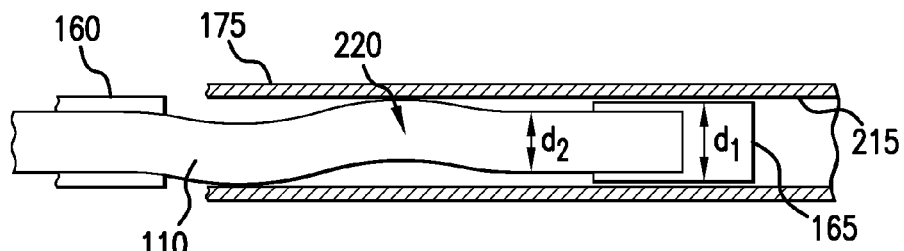
FIG. 3 is a schematic sectional side view of a version of an interface device.

Another version of the capture member 165 and the path 175 of the instrument receiving member 115 is shown in FIG. 3, where the capture member 165 is slidable within the path 175. In this version the capture member 165 has an thickness, $d_1$, that more closely matches the thickness, $d_2$, of the instrument 110. For example, in one version, the ratio of $d_2$ to $d_1$ may be from about 0.8 to about 1.0. The inner dimension of the path 175 is substantially the same as or slightly larger than $d_1$. This version is particularly useful when inserting a long instrument 110, such as a surgical instrument having a length greater than about 20 cm. Due to the resistive force associated with pushing the capture member 165 along path 175, a long surgical instrument may buckle during insertion. By having the size of the path 175 close to the size of the instrument 110, however, the sidewall 215 of the path 175 can constrain the buckling of the instrument 110 as shown in FIG. 3 at the buckling region 220. The frictional force resulting from the instrument 110 sliding along the sidewall 215 is a function of the ratio of $d_2$ to $d_1$. To overcome the added friction associated with the buckling, the materials may be selected to minimize friction, and/or the force feedback mechanism 185 may be designed to augment the insertion by forcing the capture member 165 in the insertion direction.

Figure 4:
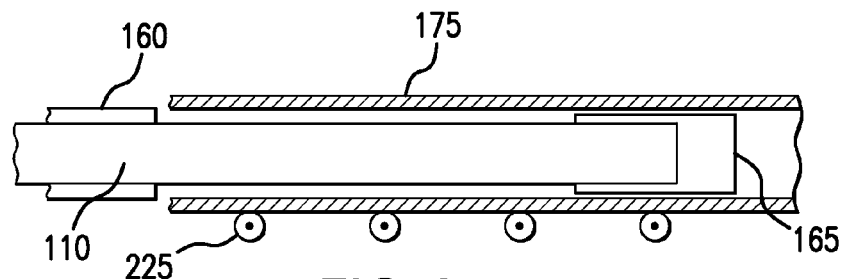
FIG. 4 is a schematic sectional side view of another version of an interface device.

FIG. 4 illustrates another version of the capture member 165 and the path 175 of the instrument receiving member 115 also useful when inserting a long surgical instrument to prevent and/or compensate for buckling thereof. In this version, the capture member 165 is fixed to the path 175 and the capture member 165 and path 175 are translatable together, for example by riding on rollers 225. In the version shown in FIG. 3, the insertion force necessary to displace the capture member 165 must be sufficiently large to overcome the friction of the capture mechanism 165 along the path 175. Then, after the instrument 110 buckles, the insertion force necessary for displacement increases due to the added frictional force of the instrument 110 sliding against the sidewall 215 of the path 175, as discussed above. The version of FIG. 4 is advantageous in that the initial insertion force necessary for displacement is a force sufficient to overcome the inertia of the capture member 165 and the path 175 and frictional forces between the path 175 and the structure holding the path 175 or the force required to roll the path 175 along the rollers 225. Furthermore, the version of FIG. 4 has the added advantage that there is no change in necessary insertion force due to buckling of the instrument 110 since there is no sliding of the instrument along the sidewall 210 of the path. This relatively constant necessary insertion force may simulate a more authentic procedure and simplifies the application of feedback forces by the force feedback mechanism 185. Telescoping tubes, for example, can be used to maintain the buckling prevention as the capture member 165 and the path 175 are displaced, such as by telescoping the path 175 and the guide passageway 160.

Figure 5:
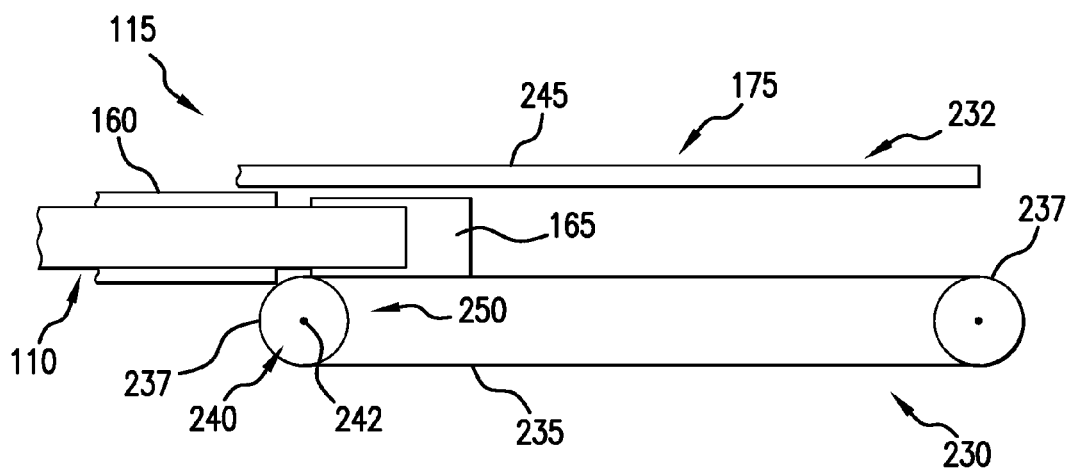
FIG. 5 is a schematic sectional side view of another version of an interface device.

FIG. 5 shows a version of an instrument receiving member 115 having a capture member 165 and path 175 configuration that is a hybrid form of the versions of FIGS. 3 and 4. In this version, the path 175 comprises a movable portion 230 and a fixed portion 232. As shown in FIG. 5, the capture member 165 is fixedly attached to the movable portion 230 which may comprise, for example, a movable belt 235 extending around a set of pulleys 237. The pulleys 237 may be freely rotatable allowing the belt to freely move with translation of the capture member 165. Alternatively or additionally, the pulleys may comprise one or more drive pulleys 240. The fixed portion 232 may comprise a plate 245 that surrounds the capture member 165 on the longitudinal sides of the capture member 165 that are not engaged by the movable portion. This version allows the capture member 165 to be closer to the orifice 120 than the version of FIG. 4, thereby allowing position detection and/or force feedback to occur with less insertion depth. This provides a more immediate simulation of the insertion procedure.

The version of FIG. 5 is also advantageous in that it allows for the use of a forcing and sensing mechanism 250 that serves as both the position detector 180 and the force feedback mechanism 185. A schematic of a version of the forcing and sensing mechanism 250 is shown in FIG. 6. The drive pulley 240 rotates about an axis 242 and drivingly engages, for example, the belt 235, such as by drive teeth or other friction increasing mechanism. The drive pulley 240 is rotatably driven in either rotational direction by a shaft 244 which is part of or is driven by an actuator 252, such as a brake (not shown) or a motor 255, adjustably controlled by an actuator controller 260. In one version, the motor 255 comprises a gear mechanism that is selectively engagable with the drive pulley 240 to cause rotation thereof and disengagable to allow for free rotation of the drive pulley 240. The forcing and sensing mechanism 250 further comprises a rotation detector 265 that detects the angular rotation of the drive pulley 240 about axis 242. The rotation detector 265 may be in communication with a detector interface 270 capable of receiving a signal from the rotation detector 265 and generating an output signal related to the angular rotation of the drive pulley 240 and accordingly related to the position of the capture member 165 and instrument 110 since the rotation of the drive pulley 240 is directly related to the longitudinal displacement of the capture member 165 and the instrument 110 which is captured therein. The actuator controller 260 and the detector interface 270 are in communication with the computer 102. For example, the computer 102 may receive the output signal from the sensor interface 270 and in response thereto may display an image on the display 130 and/or may command a force to be output by the motor 255 to provide force or haptic feedback to the medical practitioner as dictated by the program code running on the computer 102.

FIGS. 7, 8a, and 8b show versions of the instrument receiving member 115 comprising a plurality of movable portions. For example, the instrument receiving member 115 may comprise a first movable portion 230 and a second movable portion 275 opposite the first movable portion 230. As shown in FIG. 7, the second movable portion 275 may also comprise a belt 235 and pulley 237 arrangement and optionally may comprise a forcing and sensing mechanism 250 at one or more of the pulleys 237. This version reduces the friction associated with the sliding of the instrument 110 along the plate 245 when buckling of the instrument 110 occurs in the upward direction. Buckling of the instrument 110 in other directions can be prevented by providing plates (not shown) extending longitudinally between the first movable portion 230 and the second movable portion 275. Alternatively, as shown in FIGS. 8a and 8b which show longitudinal cross sections through the capture member 165, the friction can be further reduced by surrounding the capture member 165 with movable portions. For example, as shown in FIG. 8a, opposed side movable portions 280, 285 may be provided, and as shown in FIG. 8b, a triangular shaped capture member 165 may be surrounded by three movable portions 230, 290, 295.

FIGS. 9a and 9b show versions of the instrument receiving member 115 particularly useful in economizing the space or footprint of the instrument receiving member 115 and in reducing the complexity of the moving parts in the instrument receiving member 115. In this version, the capture member 165 is fixedly attached to a movable portion 230 that is in the form of a wheel 300 that allows the capture member 165 and the instrument 110 captured therein to travel along an at least partially arcuate path. As shown, the wheel 300 has a circular cross-section. However, the wheel 300 may have other cross-sections, such as partially circular, elliptical, partially elliptical, kidney-shaped, or the like, to allow the capture member 165 or the distal end 145 of the instrument 110 to travel in the at least partially arcuate path. The capture member 165 is initially in a home position, as shown in FIG. 9a, where it receives an instrument 110 being inserted through the guide passageway 160. As the instrument 110 is further inserted, insertion force causes the wheel 300 to rotate until it has rotated to an end position, such as shown in FIG. 9b. In the version shown, the wheel 300 includes a forcing and sensing mechanism 250 so that the insertion position of the instrument 110 can be detected and so that force feedback can be directly applied to the instrument 110. As can be seen from FIG. 9b, by providing an arcuate movable portion 230, such as by providing a wheel 300, the size of the instrument receiving member 115 necessary for receiving long instruments can be reduced. For example, to insert a 170 cm colonoscope into an instrument receiving member 115 having an axial pathway 175, the instrument receiving member 115 would necessarily have to be at least 170 cm long, and significantly longer if telescoping tubes or similar anti-buckling mechanisms are used. However, the same sized colonoscope can be received by a wheel 300 having a diameter of about 54 cm, thereby greatly reducing the length requirements of the instrument receiving member 115.

Although the version shown in FIGS. 9a and 9b works well for simulating the retraction portion of the surgical procedure, such as when going from the position shown in FIG. 9b to the position shown in FIG. 9a, the inserting portion of the procedure may result in the instrument 110 being significantly displaced from the wheel 300. To reduce the displacement, the instrument receiving member 115 may be programmed so that the forcing and sensing mechanism 250 causes the wheel 300 to rotate in the insertion direction as the instrument 110 is being inserted, thereby aiding the insertion force and preventing the displacement of the instrument 110 from the wheel. Alternatively or additionally, a non-movable portion 232, such as a fender 305 as shown in FIGS. 10a and 10b, may be provided around at least a portion of the wheel 300 to prevent the displacement of the instrument 110. However, as illustrated in FIG. 10a, the sliding of the instrument 110 along the fender 305 creates a significant friction force that may need to be compensated for by forcing the rotation by the forcing and sensing mechanism 250.

Figure 11A:
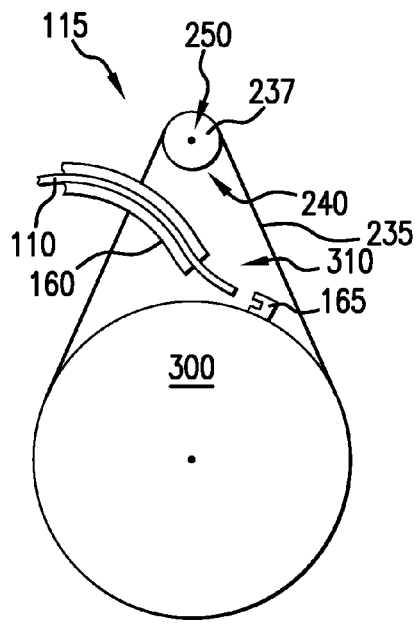
FIGS. 11a through 11d are schematic sectional side views of interface devices having a pulley and belt system.
Figure 11B:
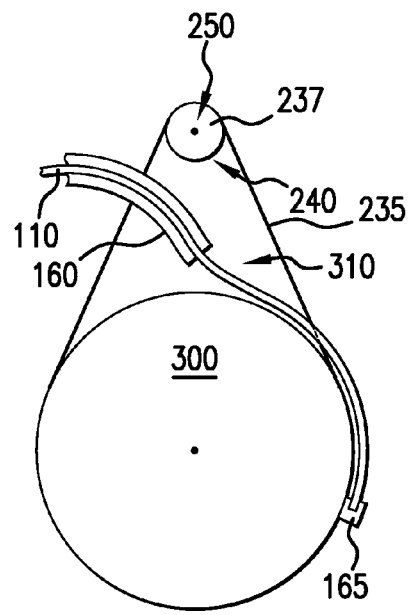
Figure 11C:
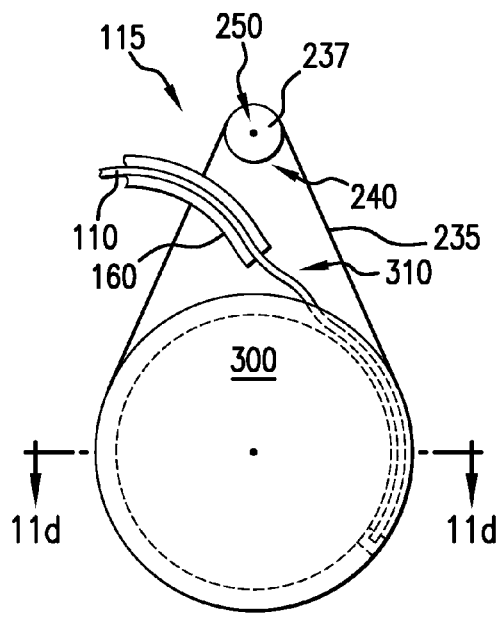
Figure 11D:
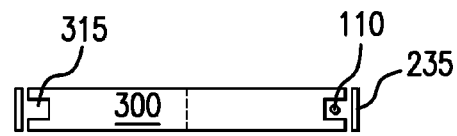

FIGS. 11a and 11b illustrate another version of the instrument receiving member 115 comprising a capture member 165 that moves in an arcuate path, such as being attached to a wheel 300, that prevents displacement of the instrument 110 from the wheel 300 without having to slide the instrument 110 along a frictional surface. In this version, a belt 235 encircles at least a portion of the wheel 300 and serves to hold the instrument 110 against the surface of the wheel 300, as shown in FIG. 3b, when the instrument 110 is inserted a sufficient amount to rotate the wheel 300. The belt 235 travels with the surface of the wheel 300 and accordingly travels with the capture member 165 and instrument 110, thereby eliminating the sliding of the instrument 110 along a surface, as in the version of FIG. 10a, while still preventing displacement. A pulley 237 may be provided to separate the belt from the wheel 300 at an open section 310 to allow the instrument 110 access to the capture member 165 when the capture member 165 is in the home position as shown in FIG. 11a. In the version shown, the guide passageway extends out of the plane defined by the wheel 300, belt 235, and pulley 237 to provide a conduit from the orifice 120 to the capture member 165 through which the instrument may pass. Optionally, the pulley 237 may be a drive pulley 240 comprising a forcing and sensing mechanism 250 to detect the position of and to drive the wheel 300. This is advantageous in that it removes weight from the wheel 300 thereby decreasing the inertial effects of rotation the wheel 300. FIG. 11c shows a version of the wheel 300 having a groove 315 housing the capture member 165 and accommodating the instrument 110 as it is provided onto the wheel 300 to provide a smoother and more secure reception of the belt 235 on the wheel 300. FIG. 11d, a cross-sectional view of the wheel 300 along section 11d-11d of FIG. 11c, shows that the groove 315 may, in one version, be provided as a square or rectangular groove to reduce the friction, particularly when twisting the instrument 165. Alternatively, the groove may have another shape, such as a rounded shape. The capture member 315 may be fixedly attached within the groove 315 or may otherwise be rotatable with the groove 315.

Figure 12:
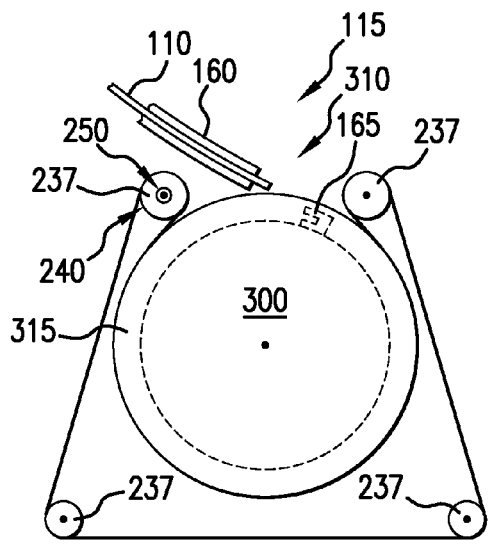
FIG. 12 is a schematic sectional side view of an interface device having a drive pulley system.
Figure 13:
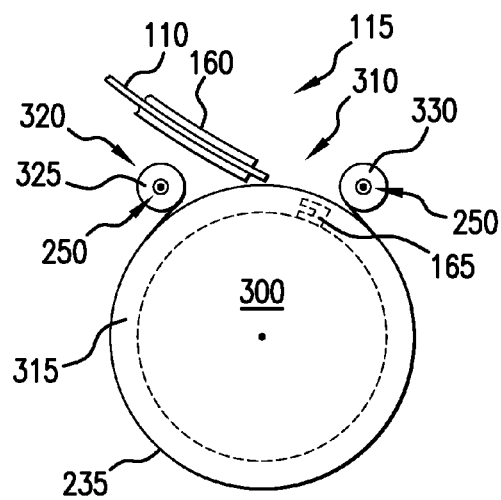
FIG. 13 is a schematic sectional side view of an interface device having a spooling system.

FIG. 12 shows a version preferred over the versions shown in FIG. 11 in that the guiding passageway 160 does not have to extend out of plane. This allows the guide passageway 160 to take on a straighter shape, thereby significantly reducing the fiction associated with inserting the instrument 110 therethrough. The opening 310 in this version is created by a series of four or more pulleys 237 that are positioned to guide the belt 235 in an anti-displacement manner, and optionally in a driving manner by providing a driving pulley 240 equipped with a forcing and sensing mechanism 250 as one or more of the four pulleys 237. Alternatively, the opening 310 can be provided as shown in FIG. 13 where the pulley system is replaced by a spooling system 320 comprising spools 325, 330 capable of winding and unwinding a length of belt 235. One or both of the spools 325, 330 may comprise a driving and sensing mechanism 250. For example, spool 325 may wind the belt 235 and spool 330 may unwind the belt 235 to generate a force in the insertion direction, and spool 325 may unwind the belt 235 and spool 330 may wind the belt 235 to generate a force in an opposite direction to the insertion direction. Alternatively to the arrangements shown in FIGS. 12 and 13, the forcing and sensing mechanism 250 may be provided at the center of the wheel 300.

Figure 14A:
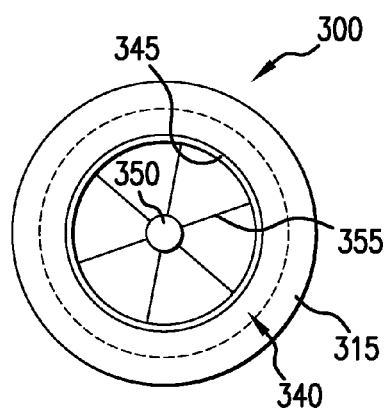
FIG. 14a is a schematic sectional side view of a version of a wheel.
Figure 14B:
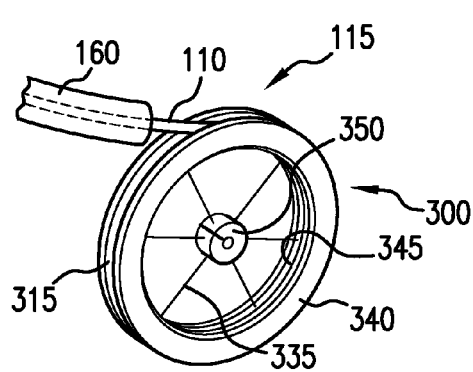
FIGS. 14b and 14c are prospective views of versions of an interface device.
Figure 14C:
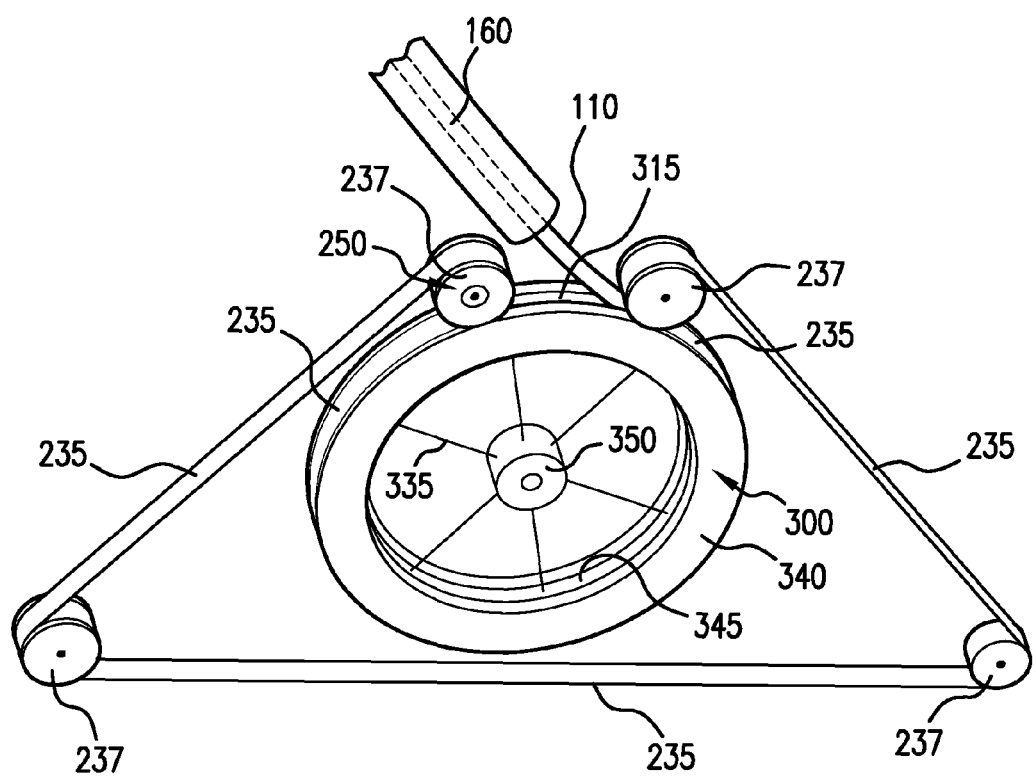

The mass of the wheel 300 may be reduced to reduce the inertial effects of rotating the wheel 300. For example, as shown in FIG. 14, the wheel 300 may comprise spokes 335, such as the spokes of a bicycle wheel, that connect to a body portion 340 by an attachment rim 345. The spokes may originate from a hub 350 which may include a driving and sensing mechanism 250. Alternatively, the wheel 300 may be used in a system where the driving and sensing mechanism 250 is on a drive pulley or where a different type of position detector 180 and/or force feedback mechanism 185 is used. The materials of the wheel 300 may be selected for their weight and/or rigidity. For example, in one version, the hub 350, spokes 335, and rim 345 may comprise a light weight metal, such as magnesium, aluminum, titanium, or the like, and the body may comprise a light weight and easily machinable, formable or moldable material, for example a polymeric, ceramic, or composite material, such as a rigid skinned urethane foam material formable by reaction injection molding. FIG. 14b shows a perspective view of an instrument 110 received on the wheel 300 after having been inserted through orifice 120 and through guide passageway 160 and captured in capture member 165. The belt 235 and associated pulleys 237 and/or spools 320 are not shown in FIG. 14b to allow for viewing of the instrument 110 on the wheel 300. The pulley arrangement of FIG. 12 is shown in prospective view in FIG. 14c.

The belt 235 may be made of a continuous band or strip of flexible material and is a width sufficient to cover the groove 315 and to contact the edge of the wheel 300 with enough surface area to drivingly engage the wheel 300 and to contain the contain the instrument 110 within the groove 315. For example, in one version, the belt 235 may be made of nylon fabric, optionally comprising a PVC coating on one or more sides thereof. The belt 235 may have a width of from about one to about three inches, preferably about two inches. The belt 235 is tightly held in tension around the pulleys 237 and the wheel 240 to allow for the application of force to the instrument 110 and to prevent the instrument 110 from being undesirably bent, such as by preventing significant displacement of the instrument 110 from the wheel 300. In one version (not shown), the spokes 335 and hub 350 of the wheel 300 may be removed to further reduce the weight of the wheel 300. In this version, the tension of the belt 235 may be sufficiently high to support the weight of the wheel 300 and clamp the wheel 300 against the upper pulleys 237. A stop member or a ledge may also be provided in this version to prevent lateral displacement of the wheel 300. The edge of the wheel 300 may be provided with an indentation, recess, or ledge (not shown) to prevent the belt 235 from sliding off the wheel 300. Additionally, the wheel 300 may comprise teeth or other driving engagers (not shown) to increase the driving contact between the belt 235 and the wheel 300.

Figure 15B:
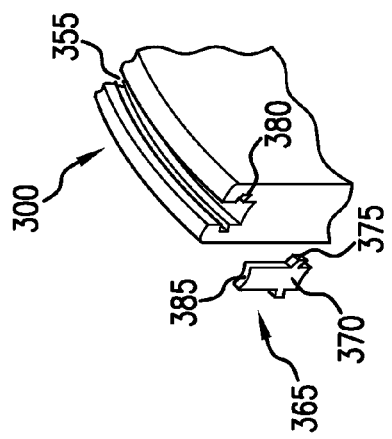
FIGS. 15a through 15d are schematic views of versions of a wheel having a helical groove.
Figure 15D:
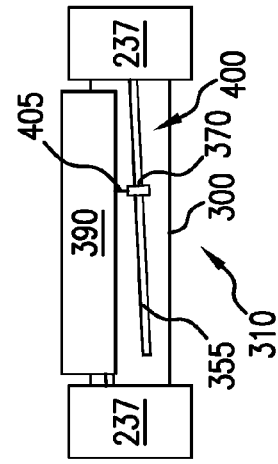
Figure 15A:
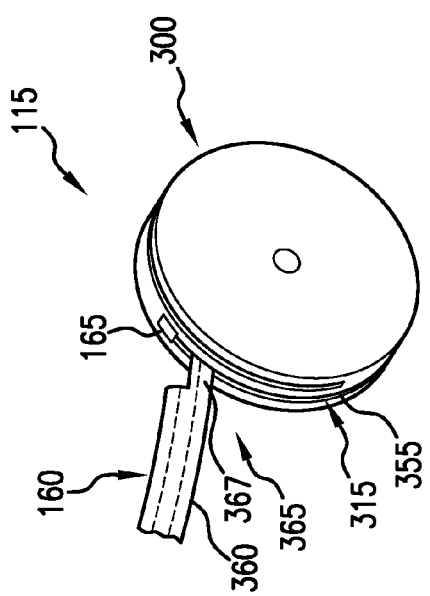
Figure 15C:
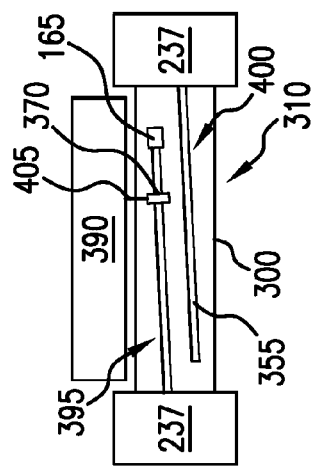

In another version, the groove 315 in wheel 300 may be an at least partially helical groove 355, as shown in FIG. 15a, to allow for longer instruments 110 or a smaller diameter wheel. The guide passageway 160 may comprise, for example, a tubular member 360 that includes a guiding section 365, such as an extending section 367 of the tubular member 360, that extends into, and optionally rides within, the helical groove 355. The tubular member is either sufficiently flexible or is pivotable so that the opening of the guide passageway 160 is laterally movable under the direction of the guiding section 365 to be generally aligned with the helical groove 355. As shown in FIG. 15b, the guiding section 365 may comprise a separate guide member 370 having one or more lateral teeth 375 that ride in one or more lateral grooves 380 within helical groove 355 to more securely hold the guiding section 365 within the helical groove 355. The guide member 370 may include a surface 385 sized and shaped to receive and attach to the tubular member 360. The guiding section 365 may also, optionally, comprise a cover member 390, such as shown in FIG. 15c which illustrates a top view of the helical groove 355 on the edge of the wheel 300 in the opening 310 between two pulleys 237. The helical groove 355 comprises a first section 395 having the capture member 165 and into which the instrument 110 may be initially inserted, and a second section 400 that is a helical continuation of the first section 395. As the instrument 110 is inserted to a length sufficient to enter the second section 400, the portion of the instrument 110 that is contained in the first section 395 and is in the opening 310 is not prevented from displacing by the belt 235. Accordingly, the guide member 370 may be attached to a cover member 390, for example by rigid attachment bar 405, so that the cover member 390 translates downwardly as the guide member 370 rides in helical groove 355 toward the second portion 400 to cover the otherwise uncovered first section 395 in the opening 310, as shown in FIG. 15d. This prevents displacement of the instrument 110 from the wheel 310 and allows for an authentic simulation of the surgical procedure for exceptionally long instruments 110. The cover portion 390 may comprise a curved plate or a series of biased rollers, for example.

Figure 16A:
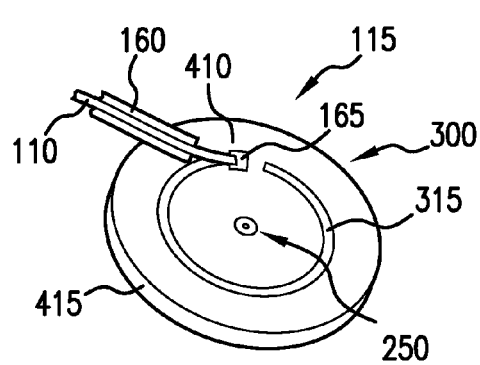
FIGS. 16a through 16f are schematic views of versions of a wheel having a groove on its face.
Figure 16B:
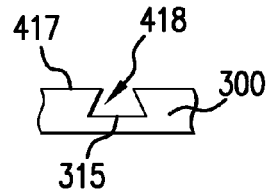
Figure 16C:
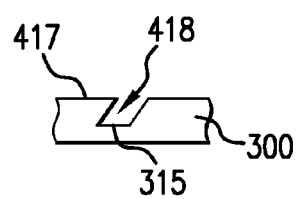
Figure 16D:
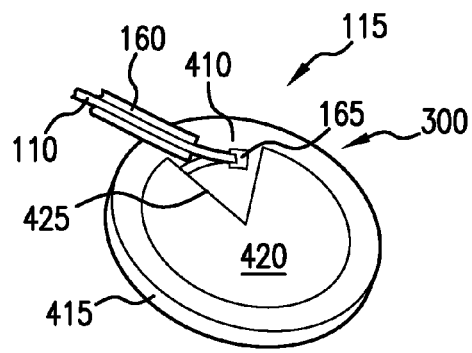
Figure 16E:
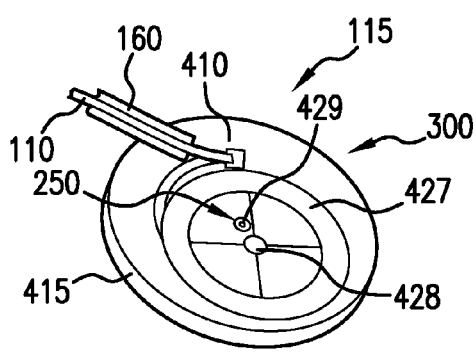
Figure 16F:
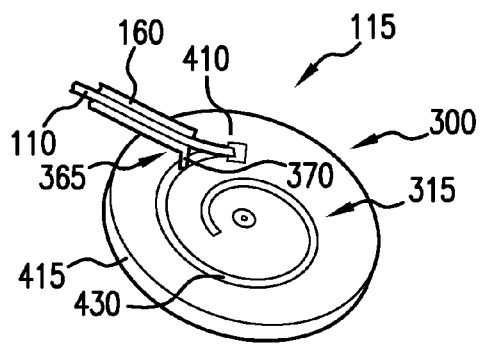

Alternatively, the groove 315 may be provided on the side surface 410 of the wheel 300, rather than on the edge 415, as shown in the version of FIG. 16a. The wheel 300 in this version rotates as the instrument 110 is inserted into the capture member 165 fixed in the groove 315, and the instrument 110 is deposited in the groove 315 which is of a substantially planar shape. In one version, as shown in FIG. 16b, the groove 315 may be provided with a lip portion 417, such as by making the groove 315 trapezoidal in shape. As the instrument 110 is forced forwardly, it is pushed into a crease 418 on the outer portion of the groove 315. In the crease 418, the lip portion 417 prevents the instrument 110 from being displaced upwardly and out of the groove 315. In another groove configuration, as shown in FIG. 16c, the side of the groove 315 opposite the crease 418 is angled in the direction opposite to that shown in FIG. 16b to allow for easier removal of the instrument 110 from the groove 315 during withdrawal of the instrument 110. In another version, to prevent displacement of the instrument 110 from the groove 315, a fixed plate 420 may be provided to cover at least a portion of the groove 315. In the version shown in FIG. 16d, the fixed plate 420 comprises an open section 425 to allow access of the instrument 110 to the groove 315. FIG. 16e shows an alternative version comprising a rotatable plate 427 that is slightly off-center from the wheel 300 to provide an opening for access to the groove 315. As the instrument 110 contacts the rotatable plate 427, the plate is caused to rotate about its axis of rotation 428, which is offset from the wheel's axis of rotation 429. This version reduces the amount of sliding contact for the instrument 110 and thereby reduces the necessary insertion force. As shown in FIG. 16f, the groove 315 may comprise a spiral groove 430 to allow for a longer instrument to be inserted. In this version, the guide passageway 160 comprises a pivot or is laterally flexible. A guiding section 365 comprises a guide member 370 to position the opening of the guide passageway 160 at the appropriate portion of the spiral groove 430. The version of FIG. 16f may also have a plate 420 that is fixed to the guide passageway 160 and/or the guiding section 365 or may be provided with the crease 418 to prevent displacement of the instrument 110.

The capture member 165 may be designed to provide an authentic simulation of the instrument insertion procedure. The capture member 165 is positionable in a home position in the instrument receiving member 115 where it is aligned with or in the guide passageway 160 to receive an instrument being inserted therethrough. Though capture members 165 that are permanently attached to the distal end 145 of an instrument 110 or that are manually attachable and/or releasable from the distal end 145 are advantageous in their simplicity and ease of manufacturing, a capture member 165 that is automatically attachable and releasable provides a more real-life experience to the medical practitioner. Additionally, the realism of the simulation can be further improved by making the capturing and releasing mechanism smooth and free of significant or abrupt forces that might be undesirably transferred to the user.

Figure 17A:
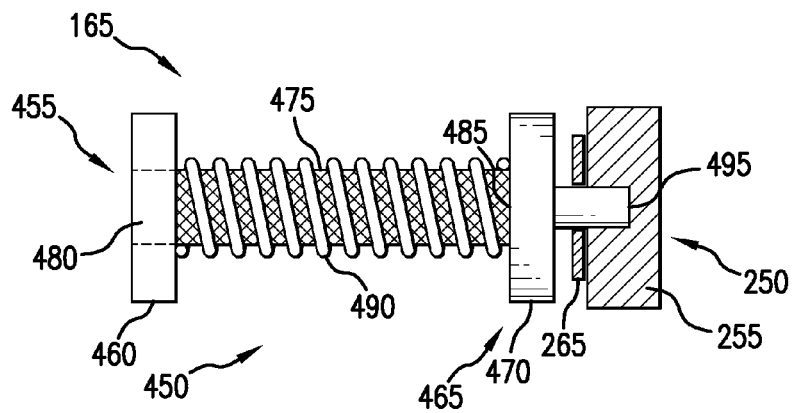
FIGS. 17a through 17c are schematic sectional side views of a version of a capture member.

In one version, the capture member 165 comprises a cuff mechanism 450, such as the cuff mechanism 450 shown in FIG. 17a. In this version, the cuff mechanism 450 comprises a receiving member 455, such as washer 460, an end member 465, such as disc 470, and a woven mesh tubular member 475 extending from the receiving member 455 to the end member 465. The woven mesh tubular member 475 may be secured to the receiving member 455 and the end member 460 by any suitable means, such as by being clamped between two plates that make up at least a portion of each of the receiving member 455 and end member 465. The receiving member 455 has an opening 480 extending into the lumen of the woven mesh tubular member 475, and the end member 465 comprises a blocking surface 485 at the opposite end of the woven mesh tubular member 475 presenting a boundary to passage through the lumen. The woven mesh tubular member 475 is typically constructed of spirally wound material and includes extendable and compressed states, whereby the woven mesh tubular member cross-sectional dimensions increase when the member is compressed and decrease when the member is extended. A helical spring 490 is disposed about the woven mesh tubular member 475 and extends from the receiving member 455 to the end member 465. Expansion of spring 490 causes the distance from the receiving member 455 to the end member 465 to increase, thereby extending the woven mesh tubular member 475 and decreasing its cross-sectional dimensions due to the spiral-shaped nature of the woven mesh material. Conversely, compression of spring 490 decreases the distance from the receiving member 455 to the end member 465, thereby increasing the cross-sectional dimensions of the woven mesh tubular member 460. The dimensions of the lumen of the woven mesh tubular member 475 are selected so that the woven mesh tubular member 475 slidingly receives the distal end 145 of an instrument 110 when compressed and clampingly grasps the distal end 145 of the instrument 110 when extended. The end member 465 may also comprise a shaft 495 received in a motor 255 capable of rotatably driving the shaft 495 under control of the computer 102, as described above, and a rotation sensor 265 capable of detecting relative rotation of the shaft 495 and the motor 255 and reporting the rotation to the computer 102 for use in adjusting the simulation.

Figure 17B:
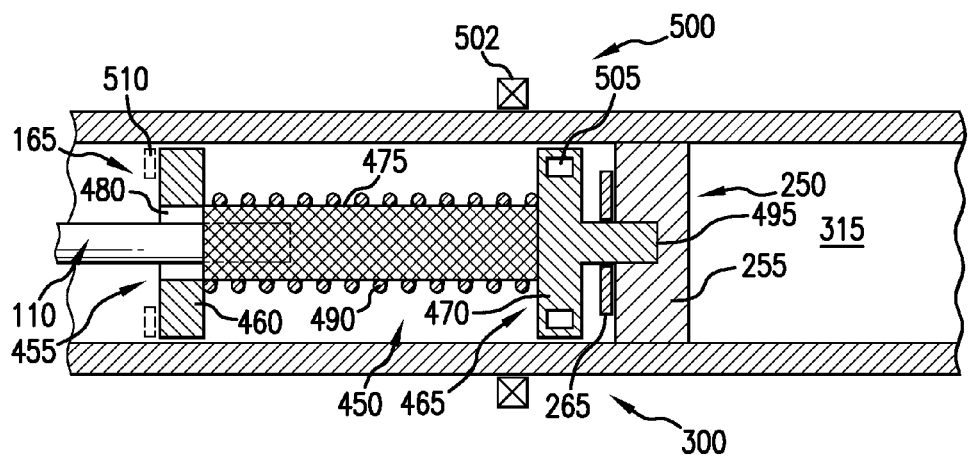
Figure 17C:
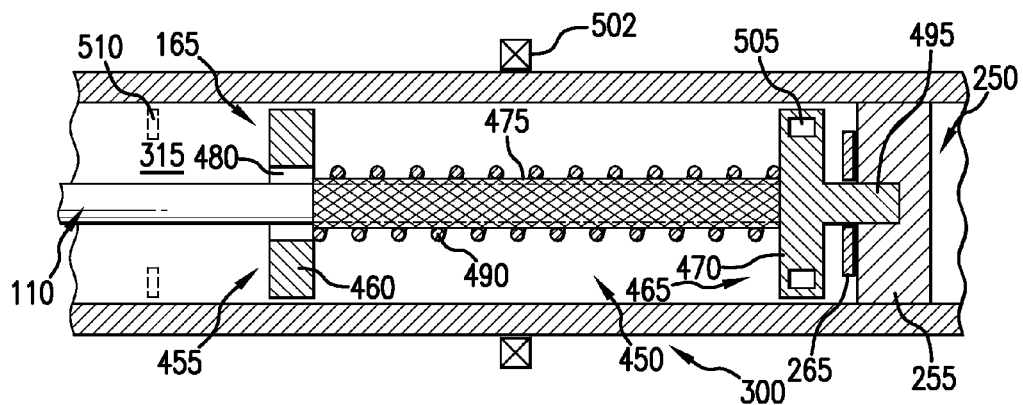

The capturing of the instrument with the capture member 165 shown in FIG. 17a is shown in FIGS. 17b and 17c, which illustrate schematic cross sections from above the edge of the wheel 300 having the capture member 165 received in the groove 315 of the wheel 300. In FIG. 17b, the capture member 165 is in the home position and the instrument 110 has been inserted into the instrument receiving member 115, directed into opening 480 in the capture member 165, and partially inserted into the lumen of the woven mesh tubular member 475. The woven mesh tubular member 475 is in its compressed condition allowing passage of the instrument 110 therethrough. The helical spring 490 in compressed to bias the receiving member 455 and the end member 465 apart and to the extended position shown in FIG. 17b. However, a latching mechanism 500 prevents the extension of the receiving member 455 and the end member 465 when the capture member 165 is in the home position. As the instrument 110 is inserted further, it contacts the blocking surface 485 of the end member 495, and when sufficient insertion force is applied, the latching of the latching mechanism 500 is overcome and the helical spring forces the receiving member 455 and the end member 465 apart, thereby extending the woven mesh tubular member 475 causing it to clampingly engage the instrument 110 to capture it in the capture member 165, as shown in FIG. 17c. Further insertion of the instrument 110 results in translation of the capture member 165 along with the instrument 110. As shown in this version, the translation may be transmitted as rotation of the wheel 300 by fixedly securing the motor 255 within the groove 315 and/or to the belt 235 which is positioned over the groove 315 to cause rotation of the wheel 300. Alternatively, the capture member 165 may be in a different path 175, such as a linear path.

The latching mechanism 500 may be designed to smoothly transition from the latched position shown in FIG. 17b to the unlatched and clamping position shown in FIG. 17c. In one version, the latching mechanism 500 may comprise one or more fixed magnets 502 positioned adjacent to the wheel 300 and creating a magnetic field attracting one or more magnets 505 in the end member 465. For example, the fixed magnets 502 may be positioned so that when the wheel 300 is rotated to the home position, the magnets 505 are sufficiently close to the fixed magnets to overcome the bias of the helical spring 490 and to draw the end member 465 towards to receiving member 455. This allows the capture member 165 to capture the instrument 110 when in the home position and to release a captured instrument 110 when returning back to the home position. In another version, the latching mechanism 500 may comprise a fixed stop 510 (shown in phantom in FIG. 17b) that prevents displacement of the receiving member 455 beyond the home position. In this version, the force feedback mechanism 185 may be used to apply a force to the end member 465, for example through a motor that can rotate the wheel 300, when the capture member 165 is in the home position, the force being sufficiently strong to overcome the force of the helical spring 490. As the wheel 300 rotates away from the home position the applied force may be gradually lessened to smoothly transition from the uncaptured to the captured conditions, and vice versa. The fixed magnets 500 or the fixed stop 510 may be secured, in one version, to the pulley 237 which is adjacent to the home position of the capture member 165.

In another version, a smooth transition from an uncaptured to a captured condition may be accomplished using a capture member 165 that couples to a coupling portion 515 of the instrument 110 by an engagable locking mechanism, such as the locking capture member 520 shown in FIGS. 18a and 18b. In this version, the instrument 110 has an distal end 145 comprising an opening 525 into which a tip portion 530 of the locking capture member 520 may be received during insertion of the instrument into the instrument receiving member 115. In FIG. 18a, the locking capture member 520 is shown in an unlocked condition in its home position. In the version shown, the distal end opening 525 comprises a conically shaped cavity 535 and the tip portion 530 of the locking capture member 520 comprises a tapering tip 540 to facilitate insertion into the opening 525. The locking capture member 520 comprises a body 545 having a shoulder 550 against which an end 555 of the instrument 110 may abut and apply force to the body 550 as the instrument 110 is inserted. In the home position shown in FIG. 18a, the instrument 110 is freely slidable onto the tip portion 530 and removable from the tip portion 530. At least partially within the body 545, a locking member 560 is held in an unlocking position when the locking capture member 520 is in the home position by a fixed ring 565 which is grounded and not movable with the groove 315 and wheel 300 and which applies force to an extending portion 567 of the body 560. The ring 565 applies force to the extending portion 567 by using magnets or by applying force with the force feedback mechanism 185, as discussed above in connection with the version shown in FIGS. 17a-17c. A spring 570 biases the locking member 560 toward the tip 540. As the end 555 of the instrument 110 contacts the shoulder 550, it translates the body 550 and, thus, the wheel 300 which is fixed thereto and moves the locking capture member 520 beyond the fixed ring 565 allowing the locking member 560 to move toward the tip 540 under the force of the spring 570.

The locking member 560 moves a lock 575 from an unlocked to a locked position. In one version, the lock 575 comprises a ball 580 nested in a hole 585 in the body 545. A ramp surface 590 on the locking member 560 is shaped and positioned so as to allow the ball 580 to lower to an unlocked position when the locking member is retracted, as shown in FIG. 18a, and to rise above the surface of the body 545 to a locking position when the locking member 560 is extended to the position shown in FIG. 18b. In the locking position, the ball 580 engages a receiving section 595 in the opening 525 of the instrument 110 to prevent retraction of the instrument 110 from the locking capture member 520. The distal end 145 of the instrument is sufficiently rigid to prevent undesirable removal of the instrument 110 from the locking capture member 520 when in the locked position. Accordingly, during the simulation procedure, further insertion and retraction of the instrument 110 results in translation of the locking capture member 520 until sufficiently retracted to return the capture member to the home position where the ring 565 may again force the locking member 560 to the unlocked position allowing for the removal of the instrument 110. A plurality of balls 580 and holes 585 may be provided to more securely lock the parts.

The locking capture member 520 may also be longitudinally rotatable with the instrument 110 when coupled thereto to allow for the twisting of the instrument 110 to be detected and optionally to allow rotational force feedback to be applied. For example, as shown in FIGS. 18a and 18b, the body 545 of the locking capture member 520 may comprise a shaft 600 receivable within a motor 255 of a forcing and sensing mechanism 250 which is fixed within the groove 315, or other pathway. The forcing and sensing mechanism 250 is able to sense the rotation of the instrument 110 and to actuate rotational forces to be applied to the instrument 110, as discussed above. The end 555 of the instrument 110 and the shoulder 550 of the body 545 may comprise engagable teeth (not shown) so that the rotation of the instrument 110 or the locking capture member 520 may be transferred to the other. Alternatively, longitudinal grooves along the surface of the body 545 or a boss may be provided, or the lock 575 may engage the instrument 110 in a non-rotatable manner.

Figure 18C:
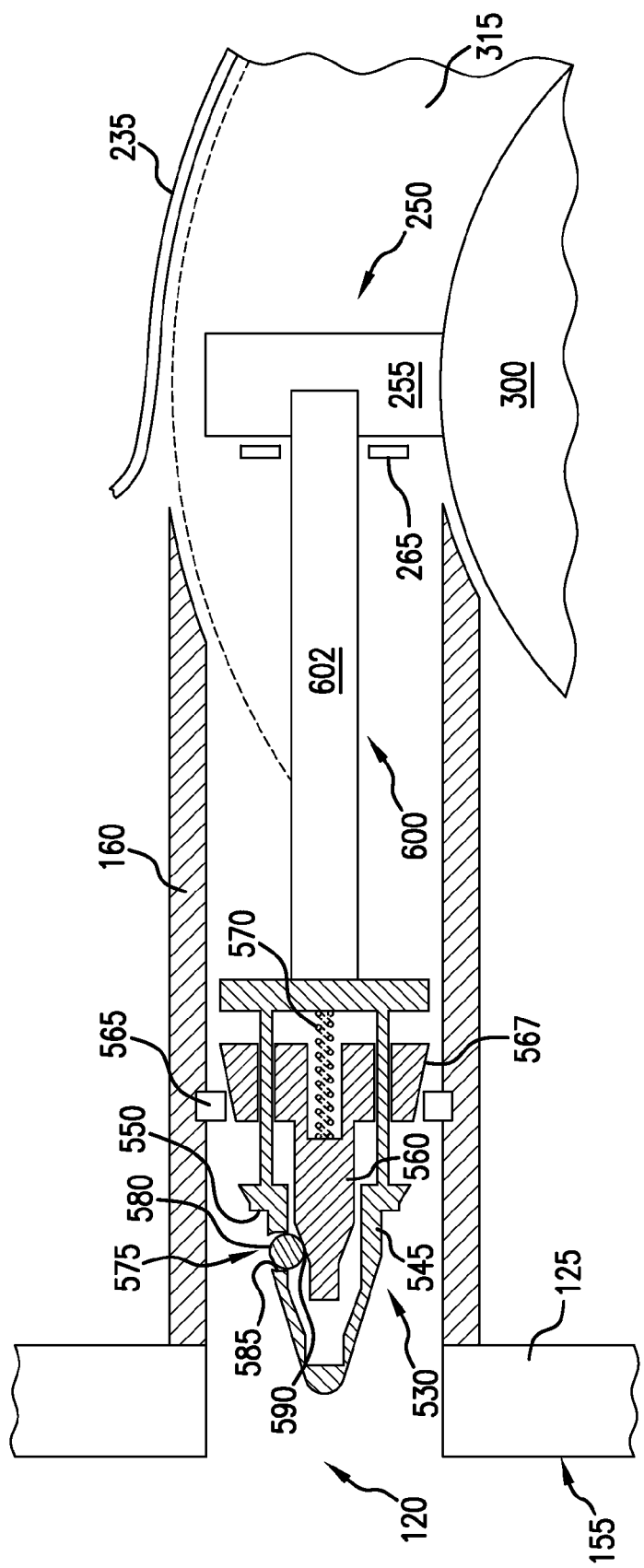
FIG. 18c is a schematic sectional side view of another version of a capture member.

FIG. 18c shows another version of a capture member 165 that allows the capture member 165 to be positioned adjacent or near the opening 120 into the instrument receiving member 115. In this version, the shaft 600 connecting the capture member 165 to the forcing and sensing mechanism 250 comprises a flexible member 602 that is sufficiently flexible to bend, and is sufficiently rigid in tension, compression and torsion to transfer tensile, compressive, and torsional forces from the capture member 165 to the forcing and sensing mechanism 250. The forcing and sensing mechanism 250 is fixed to the path, such as by being fixed within the groove 315 in the wheel 300 in the version shown in FIG. 18c. In this way, the capture member 165 may come out of the groove 315 and extend into the guide passageway 160 so that its home position is located near the opening 120. In this version, the fixed ring 565 is fixed to the guide passageway 160. Thus, the simulation may begin as the instrument 110 is inserted into the opening 120. During insertion, the flexible member 602 transfers the insertion force to the wheel 300 which begins to rotate, the rotation of which is detected, as discussed above, to control the simulation. To provide force feedback, the wheel 300 may be caused to rotate, thereby applying force to the flexible shaft 602 which is transferred to the capture member 165 and to an instrument 110 coupled thereto. As shown, the twisting of the instrument 110 may also be detected and torsional force feedback may also be provided by the forcing and sensing mechanism 250 attached to the flexible shaft 602. Alternatively, the flexible shaft 602 may be fixedly attached to the groove 315 to provide a simplified device that does not include twist sensing and/or torsional force feedback. As the wheel 300 is rotated a distance greater than the length of the flexible shaft 602, the capture member 165 is received within the groove 315 and contained therein by the belt 235 or other member that reduces displacement from the wheel 300 or path. Then, as the instrument 110 is being removed, the capture member within the groove 315 is pushed back through the guide passageway 160 to its home position shown in FIG. 18c.

Figure 19A:
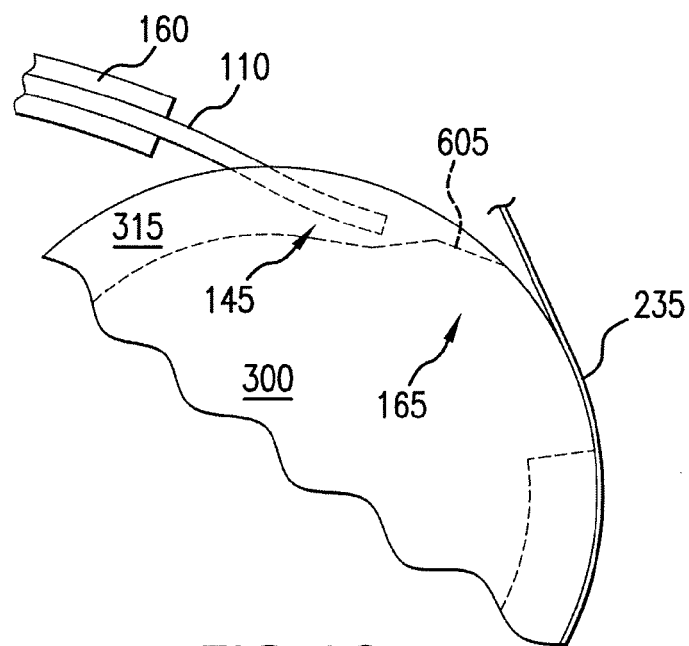
FIGS. 19a and 19b are schematic sectional side views of other versions of capture members.
Figure 19B:
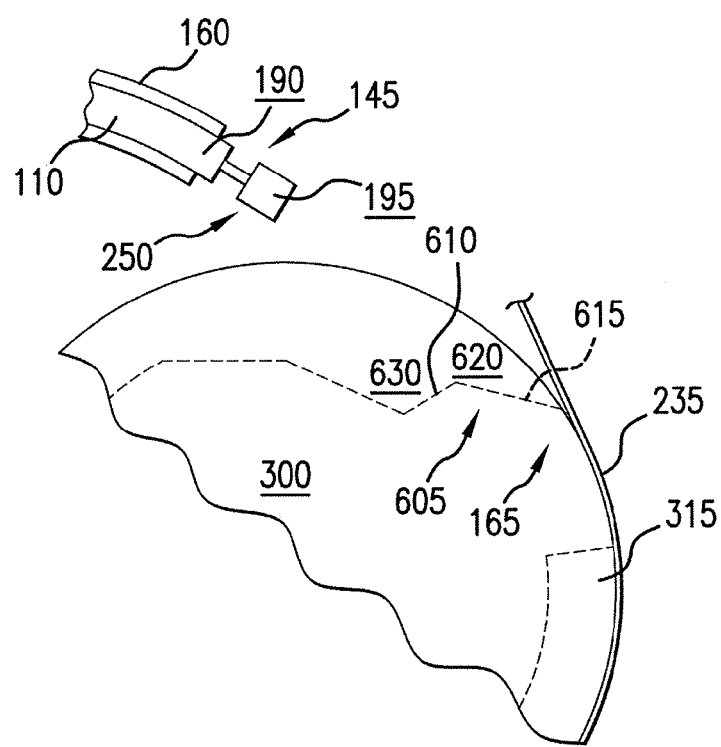

FIGS. 19a and 19b illustrate alternative versions of a capture member 165. In the version of FIG. 19a, the wheel 300, or otherwise shaped pathway, comprises a groove 315 having an inwardly tapering region 605. In the home position the inwardly tapering region is positioned to be in proximity to the guide passageway 160 to that the inserted instrument 110 is insertable into the groove 315 and the distal end 145 contacts and rides along the inwardly tapering region 605. As the instrument is further inserted, the distal end 145 is pinched between the inwardly tapering region 605 of the groove 315 and the belt 235. Consequently, further insertion of the instrument causes rotation of the wheel 300 and movement of the belt 235. In the version of FIG. 19b, the inwardly tapering region 605 comprises a first sharply tapering portion 610 and a second less sharply tapering portion 615 creating a narrow groove region 620 and a wider groove region 630. With this version, an instrument 110 having an distal end 145 comprising a distal tip 195 which is relatively rotatable relative to the body 190 may be inserted into the groove 315. The distal tip 195 may then be pinched in the second region 620 and the body may be rotatable within the first region 630. The distal tip 190 may comprise a forcing and sensing mechanism 250 to sense and/or simulate twisting of the instrument 110.

Figure 20B:
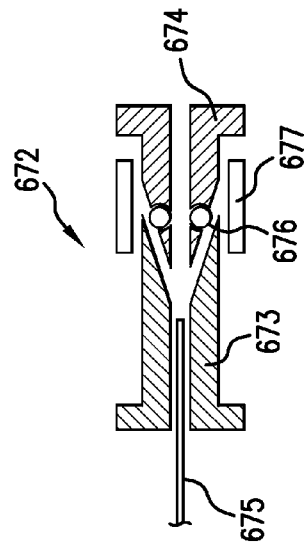
FIG. 20b is a sectional side view of a working channel force feedback mechanism.
Figure 20A:
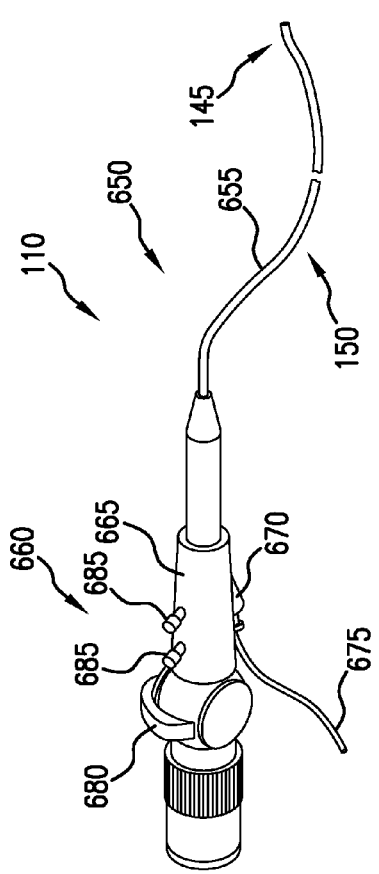
FIG. 20a is a schematic view of a mock surgical instrument.

The interface device 105 may also comprise one or more sensors that are positioned on or in communication with the instrument 110. For example, as shown in FIG. 20a, one or more sensors may be provided on a handle of the mock surgical instrument to sense hand or finger movements that a medical practitioner may perform during a surgical procedure. FIG. 20a shows a mock endoscope 150, such as a mock bronchoscope 650 comprising a bronchoscopic tube 655 connected to a handle 660. The handle comprises a grippable surface 665, a working channel 670 for receiving a working channel tool 675, a thumb lever 680, and one or more switches 685. The mock bronchoscope 650 is designed to closely resemble the look and feel of an actual bronchoscope. One or more sensors in the handle allow the computer 102 to simulate the operation of an actual bronchoscope. Thus, the simulation being displayed to the medical practitioner based on the detection of the position of the distal end 145 of the instrument can be adjusted by manipulating the handle.

The working channel tool 675 enables simulation of various devices, such as a biopsy device, a needle transbronchial biopsy tool, a grasping bronchial biopsy tool, forceps, laser or other instrument that may be inserted within and manipulated via an endoscope working channel during an endoscopic procedure. The working channel tool 675 is similar to a cable attached to an actual biopsy tool, forceps or transbronchial biopsy tool. The mock endoscope 650 for the simulation system typically contains approximately ten inches of the working channel tool 675 and permits the working channel tool 675 to move within and external of the mock endoscope 650, or to be removed entirely and replaced by a different working channel tool. Translational and rotational motion of the working channel tool is generally measured by one or more sensors, such as encoders disposed within the mock endoscope 650. The working channel may alternatively or additionally include actuators to provide force feedback to the working channel tool 675. FIG. 20b shows a version of a working channel took force feedback mechanism 672 in a working channel 670 of a mock endoscope 650 where the working channel tool 675 is removable from the working channel 670. Within the working channel 670, the force feedback mechanism 672 receives the working channel tool and selectively applies a force thereto, for example by applying a passive braking force, in accordance with program code. In the version shown, the force feedback mechanism 672 comprises a plunger 673 partially overlapping a braking member 674 which houses one or more movable locking balls 676. A solenoid is selectively energized to attract the plunger 673, thereby forcing the locking balls inward to contact the working channel tool 675 and to apply a braking force thereto. Optionally, a length of rubber tubing may be provided between the balls 676 and the working channel tool 675 to more evenly distribute the braking force across the working channel tool 675 and better grip the tool. Alternatively, an active force feedback mechanism may be used.

Other sensors may be provided to simulate other operations of the endoscope. For example, the thumb lever 680 of mock bronchoscope 650 may be utilized to simulate flexing or bending of the distal end 145 of the bronchoscope. Specifically, the handle 660 may include an encoder (not shown) to measure manipulation of thumb lever 680 and provide a signal to the computer 102 indicative thereof. Manipulation of the thumb lever enables simulation of virtual camera motion at the distal end 145 the endoscope. The thumb lever 680 may optionally include adjustable frictional resistance using any one of a number of damping mechanisms, and additionally may include computer controlled force feedback via an actuator (not shown). Switches 685 on the handle 660 of mock endoscope 650 may be used to simulate irrigation with fluids, suction of the fluids from, for example, the lungs and to control a simulated recording system that may capture video and/or still images from the monitor system. The switches provide signals to the computer 102 to enable the computer 102 to perform the desired simulation.

Figure 21B:
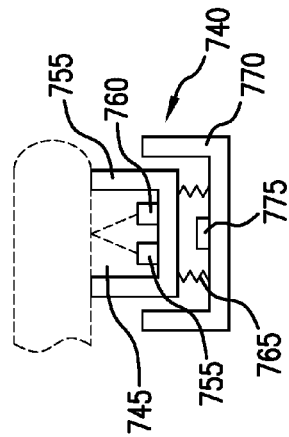
FIG. 21b is a schematic sectional side view of a sensor usable with a mock surgical instrument or other instrument.
Figure 21A:
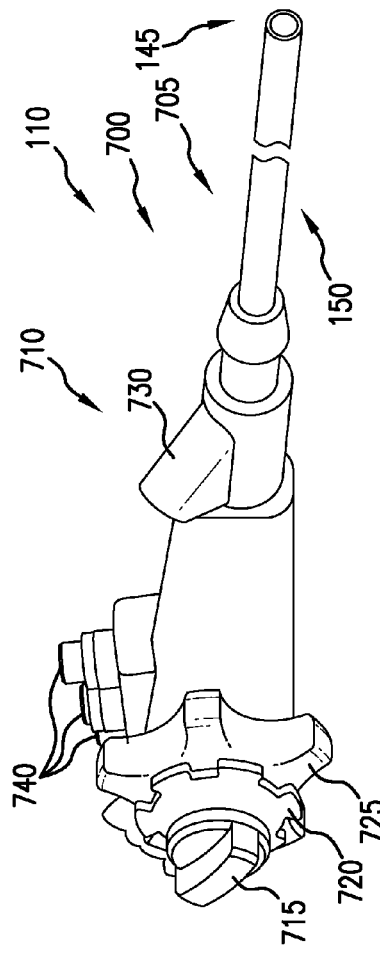
FIG. 21a is a schematic view of another mock surgical instrument.

FIG. 21a illustrates another mock endoscope 150, such as a mock colonoscope 700 comprising a colonoscopic tube 705 and a handle 710. The handle of the mock colonoscope 700 comprises rotatable knobs 715, 720, 725, working channel 730, and one or more buttons 735. Associated with one or more of these features may be a sensor, to signal to the computer 102 manipulation of the features. The computer may use the sensed information to adjust the simulation accordingly. Specifically, in this version, the rotatable knobs 715, 720, 725 may simulate side to side and up and down deflection of the distal end 145 of the instrument 110 and may simulate the locking of the deflection in a particular position. And the working channel 730 may contain a sensing mechanism and/or a force feedback mechanism to enable simulation of the insertion of an working channel tool, as discussed above.

In one version, one of the buttons 740, such as the forwardmost button 740 may simulate the action of an insufflation button on an actual endoscope. In actual endoscopy, particularly colonoscopy, the passageway being viewed may need to be insufflated in order to expand the passageway to view its interior. An actual endoscopic insufflation button has a hole that when covered by a finger introduces fluid to insufflate the passageway. When the button is depressed, water is instilled to clean mucus and fecal matter from the video camera lends. To simulate the operation of the actual insufflation button, a button 740 on the mock endoscope 150 has a hole 745 in a finger contacting portion 750, as shown in FIG. 21b. Within the hole 745, a light emitter 755 and a light detector 760 are positioned. When the hole is covered by a finger (shown by dashed lines) or other object, light emitted from emitter 755 is reflected and detected by light detector 760. The emitter 755 may emit light of a particular wavelength and the detector may be designed or set to detect light of that wavelength to reduce noise and false signals. Additionally, the finger contacting portion 755 may be depressible against springs 765 and into a base 770 to contact a sensor 770 indicating depression of the button. Signals from the detector 760 and the sensor 770 are provided to the computer 102 to allow the computer 102 to simulate insufflation when the hole 745 is covered and to simulate the instillation of water when the button 740 is depressed. The computer 102 may also provide sound simulation of insufflation, water instillation, and suction to add to the simulation experience. The emitter 755 and detector pair 760 may be a reflective optoelectronic sensor. Alternatively, an analog sensor may be used to simulate partial closing of the hole 745. The sensing button 740 of FIG. 21b may be incorporated into actual endoscopic handles to provide electronically controlled insufflation and/or instillation during actual surgical procedures.

The position detector 180 and the force feedback mechanism 185 may be embodied in a forcing and sensing mechanism 250, such as the forcing and sensing mechanism 250 previously described and shown in FIG. 6. The forcing and sensing mechanism 250 may be attached to a pulley capable of driving a belt, to a wheel, to the capture member, or to other rotating and/or driving devices. Alternatively, the position detector 180 with a different or with no force feedback mechanism 185, and the force feedback mechanism 185 may be used with a different or with no position detector.

The force feedback mechanism 185 may comprise an actuator, such as a motor 255 that is grounded, for example by being grounded by a housing relative to the wheel 300 or pulley 240 or by being grounded within the pathway, such as within groove 315. The rotational shaft 244 driven by the motor is coupled to the wheel 300, pulley 240, or capture member 165 to apply forces thereto. The motor 255 may be one or more linear current control motors, such as DC servo motors, which may receive current signals to control the direction and torque (force output) that is produced on a shaft; the control signals for driving the motor are generated by the computer 102 according to program code and are provided to the motor 255 through motor controller 260, as discussed above. The motor 255 may include one or more brakes which allow the rotation of the shaft to be halted in a short span of time. In alternate embodiments, other types of motors or actuators can be used, such as a stepper motor controlled with pulse width modulation of an applied voltage, pneumatic/hydraulic motors, voice coil actuators, or passive actuators (magnetic particle brakes, pneumatic/hydraulic passive brakes, etc). It should be noted that the motor 255 will only cause rotation of the shaft 244 if the user is not causing the same or greater amount of rotational force to the shaft 244 in the opposite direction. However, the user will feel effects of the force being applied by the motor 255, even when the force does not overcome an insertion, retraction or torsional force being applied by the user.

The position detector 180 may be positioned to detect the rotation of the shaft 244, and may comprise a sensor, such as rotation detector 265, coupled to the motor 255. One portion of the sensor is grounded by being coupled to the housing of the motor 255 which is itself grounded. A rotary shaft or encoder wheel of the sensor is rigidly coupled to the shaft 244, such that the sensor detects any motion caused by the output force of the motor 255. The sensor also detects any rotary motion of the shaft 244 caused by the user manipulating the instrument 110. In one version, the sensor comprises one or more relative optical encoders which provide signals to measure the angular rotation of the shaft 244. An encoder wheel can be provided on the shaft 244 with a number of slots. A beam emitter and a detector (not shown) are positioned on opposing sides of the encoder wheel to detect the number of slots that have rotated past the detector, so that the rotation of the encoder wheel is detected, as is known to those skilled in the art.

The position detector 180 may alternatively comprise other types of sensors. For example, the position detector, need not be rotary based, but may detect the linear translation of, for example, the capture member 165. It should be noted, too, that the position detector 180 may comprise either absolute or relative sensors, or both. An absolute sensor is one which the angle of the sensor is known in absolute terms, such as with an analog potentiometer. Relative sensors only provide relative angle information, and thus require some form of calibration step which provide a reference position for the relative angle information. Alternative sensing technologies include but are not limited to include, for example, potentiometers, global positioning systems (GPS), Hall Effect and other magnetic and electromagnetic sensors, ultrasonics and other acoustic devices, CCD cameras, lateral effect photodiodes, infrared emitters and detectors, variable resistance strain-sensors, electromagnetic sensors, fiber optic sensors, infrared based sensors, linear encoders, resolvers, sonar, radar, LVDT's, proximity sensors, interferometry, and the like. For example, in one version, the sensors may comprise electromagnetic position sensors comprising a transmitting antenna and a receiving antenna. In one version, the forcing and sensing mechanism 250 may comprise a motor/encoder pair comprising, for example, a LO-COG Series 9000 Brush Commutated Motor available from Pittman in Harleysville, Pa.

The forcing and sensing mechanism 250 may be positioned to advantageously reduce the amount of inertia to be overcome by the user during the simulation. For example, the forcing and sensing mechanism 250 may be decoupled, meaning that the actuators and sensors are both directly coupled to a grounded member which is coupled to a ground surface that carries the weight of the forcing and sensing mechanism 250, not the user inserting the instrument 110. The weights and inertia of the forcing and sensing mechanism 250 is thus substantially negligible to the user. This provides a more realistic simulation, since the computer 102 can control the forcing and sensing mechanism 250 to provide substantially all of the forces felt by the user. The instrument receiving member 115 is a high bandwidth force feedback system, meaning that high frequency signals can be used to control the force feedback mechanism 185 and these high frequency signals will be applied to the user object with high precision, accuracy, and dependability. The user feels very little compliance or "mushiness" when handling the instrument 110 due to the high bandwidth.

Figure 22:
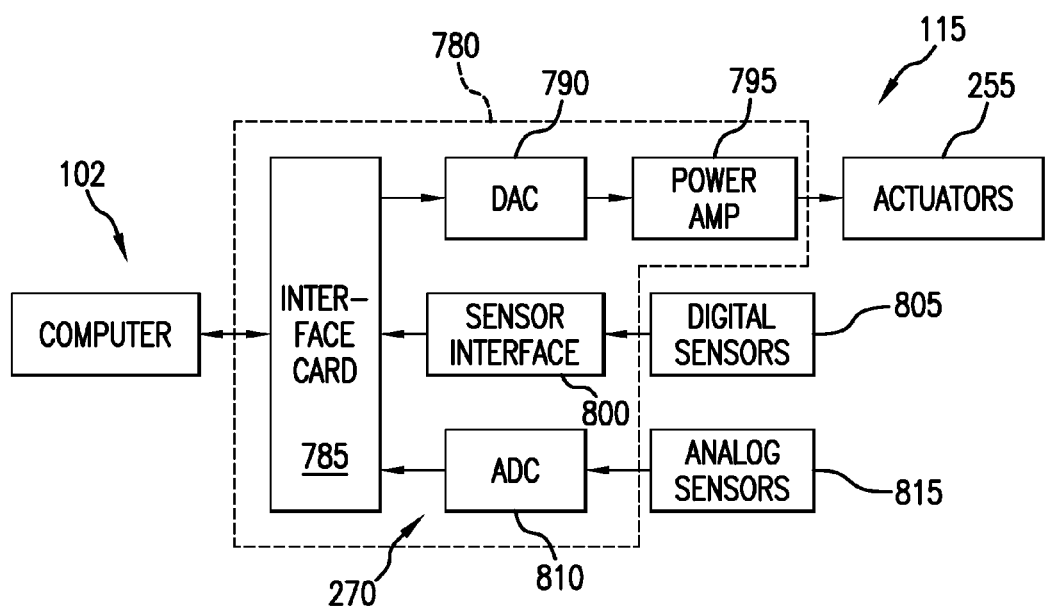
FIG. 22 is a diagram of an interface for the interface device.

FIG. 22 is a schematic view of interface electronics 780 for allowing communication between the computer 102 and the instrument receiving member 115. The interface electronics 780 comprises, for example, an interface card 785, digital to analog converter (DAC) 790 and power amplifier circuit 795 for communicating a signal to the actuator 255 in the instrument receiving member 115, and digital sensor interface 800, if digital sensors 805 are used in the position detector 180 and/or in the instrument 110, and analog to digital converter (ADC) 810, if analog sensors 815 are used. Interface card 785 is preferably a card which can fit into an interface slot of the computer 102. For example, if computer 102 is an IBM AT compatible computer, interface card 785 can be implemented as an ISA or other well-known standard interface card which plugs into the motherboard of the computer and provides input and output ports connected to the main data bus of the computer 102. Digital to analog converter (DAC) 790 is coupled to interface card 785 and receives a digital signal from computer 102. DAC 790 converts the digital signal to analog voltages which are then sent to power amplifier circuit 795. Power amplifier circuit 795 receives an analog low-power control voltage from DAC 790 and amplifies the voltage to control actuators, such as motor 255. Digital sensors 805 provide signals to computer 102 related to the position of the instrument 110 in the instrument receiving member 115 or to the position of switches, tools, levers or buttons on the instrument 110. For example, as discussed above, the sensors 805 may be relative optical encoders, which are electro-optical devices that respond to a shaft's rotation by producing two phase-related signals. In the described embodiment, sensor interface circuit 800, which is preferably a single chip, receives the signals from digital sensors 805 and converts the two signals from each sensor into another pair of clock signals, which drive a bidirectional binary counter. The output of the binary counter is received by computer 102 as a binary number representing the angular position of the encoded shaft. Such circuits, or equivalent circuits, are well known to those skilled in the art; for example, the Quadrature Chip from Hewlett Packard, California performs the functions described above. Analog sensors 815 can be included instead of or in addition to digital sensors 805. Analog sensors 815 provide an analog signal representative of the position of the user object in a particular degree of motion. Analog to digital converter (ADC) 810 converts the analog signal to a digital signal that is received and interpreted by computer 102, as is well known to those skilled in the art.

Figure 23:
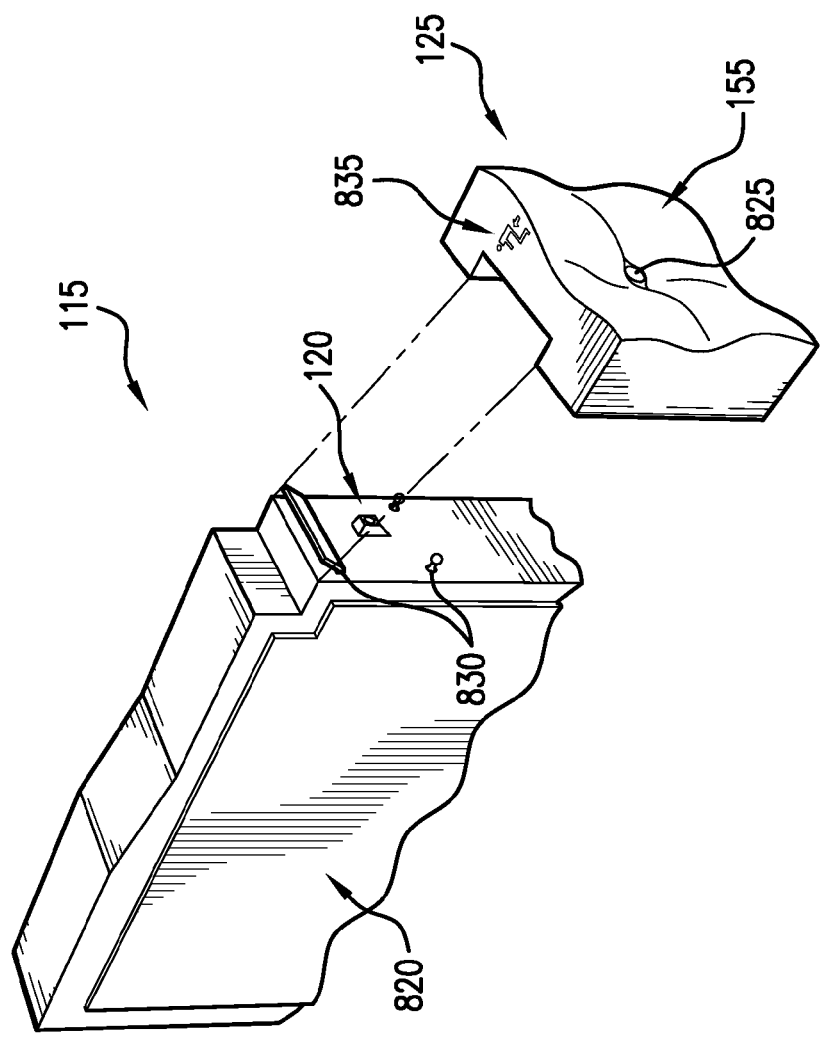
FIG. 23 is a schematic of a housing for an interface device.

The instrument receiving member 115 may include a housing 820 into which the instrument 110 may be inserted. For example, as shown in the FIG. 23, the housing 820 may be a box-like member sized and shaped to contain the wheel 300 or other path. The housing 820 comprises the orifice 120 into which the instrument 110 may be inserted during the simulation procedure. Optionally, an entry member 125 may be fastenable onto the housing 820. The entry member 125 comprises a through hole 825 alignable with the orifice 120 in the housing, and may be attachable to the housing by one or more fasteners 830, such as hook or clips that engage corresponding hooks or clips on the back side of the entry member 125. The entry member 125 may have a contour 155 that simulates an anatomy, for example a buttocks, and may be rotatable to a desired position. As shown in FIG. 23, the buttocks contour is attachable to the housing 820 at an angle to simulate a patient positioned to undergo a colonoscopy and includes a graphic 835 to aid in installation orientation. In another version, an entry member 125 may resemble a face and may be positioned on top of the housing 820 to simulate a patient lying on his or her back.

Figure 24A:
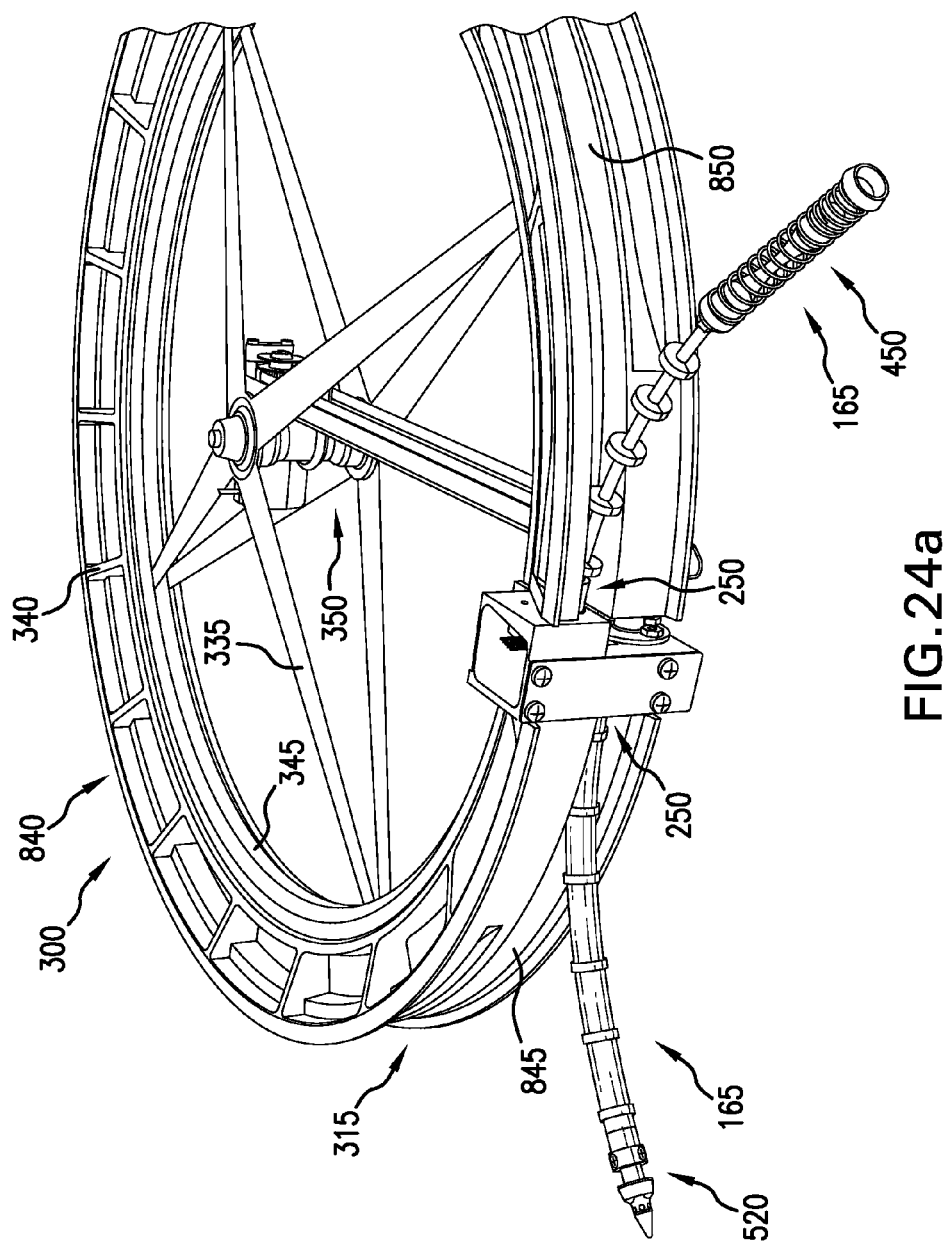
FIG. 24a is a schematic view of a multi-groove wheel.

In another version, the instrument receiving member 115 is able to receive more than one instrument 110. For example, as shown in FIG. 24a, the wheel 300 may be a multi-groove wheel 840 comprising a first groove 845 and a second groove 850 spaced from the first groove 845. The first groove 845 has a first capture member 165 fixed therein, and the second groove 850 may have a second capture member 165 fixed therein. In the version shown, the first groove 845 has a locking capture member 520 sized to receive a mock colonoscope and the second groove 850 has a cuff capture member 450 sized to receive a mock bronchoscope. However, this version is used merely for explanation. The capture members may be the same size, the same type, or sized and shaped to receive instruments other than colonoscopes and bronchoscopes. Also, the first groove 845 and the second groove 850 may be sized to accommodate the instrument being inserted thereinto. The insertion direction for each groove may cause rotation of the wheel 850 in the same direction (not shown) or in opposite directions (as shown). The first and second capture members 165 may be fixed to the wheel 840 in proximity to one another so that a first guide passageway 860 and a second guide passageway 865 have access to an opening 310 in a pulley and belt system, as shown in FIG. 24b, which shows a multi-groove wheel 840 within the housing 820 and driven by a drive pulley 240 and belt 235. The first and second capture members 165 may be received within the first guide passageway 860 and the second guide passageway 865, respectively, when they are in there home positions and are being used and may be contained within the grooves when not being used. Other drive mechanisms and path configurations, as discussed above, may alternatively or additionally be used with the multi-groove wheel 840.

Figure 24C:
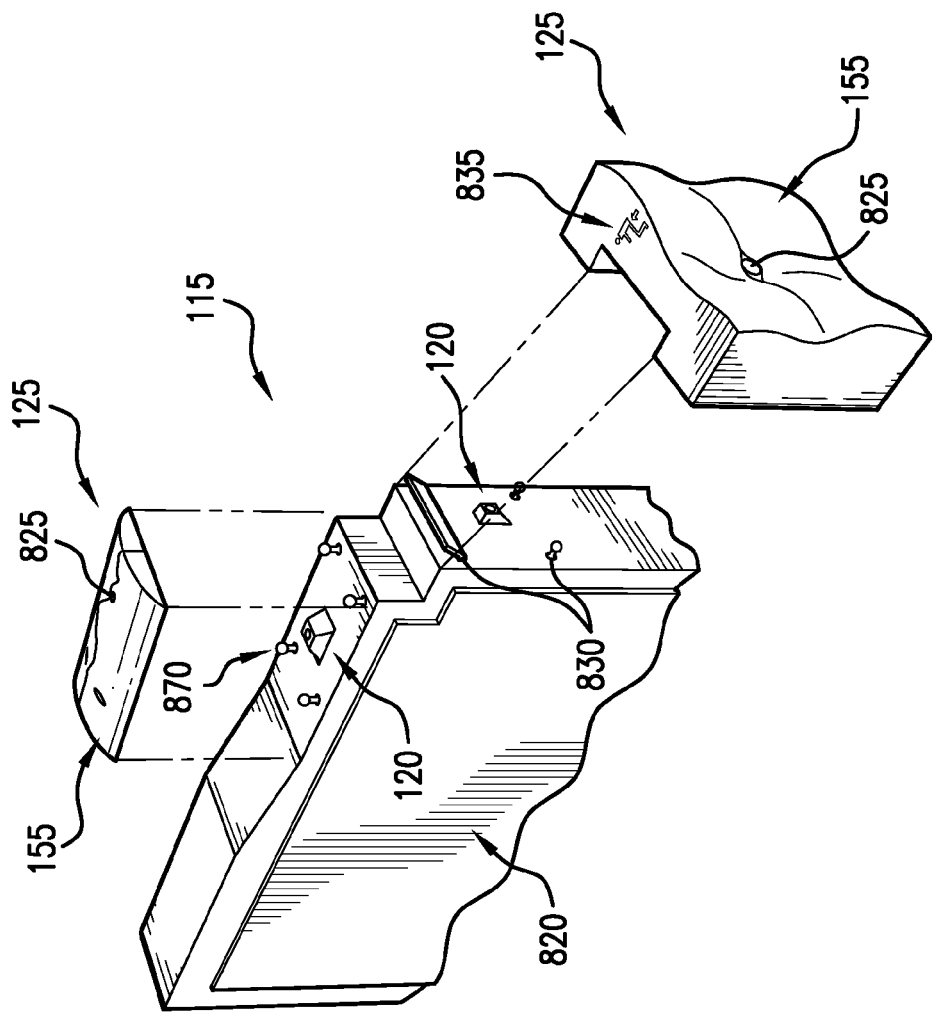
FIG. 24c is a schematic of a housing for another version of an interface device.

As shown in FIG. 24c, the housing 820 may be adapted to accommodate the multi-groove wheel 840 by providing two or more orifices 120 into which a desired instrument 110 may be inserted. Also, additional fasteners 870 may be provided for attaching a second entry member. The user informs the computer 102 which procedure is to be simulated and which orifice is to be used. The computer then selects and runs the corresponding routine and the simulation is ready to begin.

FIGS. 25a and 25b illustrate addition versions of the instrument receiving member 115 that have movable paths other than on a wheel. In these versions, the capture member 165 is fixed to a linearly traveling portion of a belt 235. For example, as shown in FIG. 25a, the capture member 165 is secured to the belt 235 and is within a groove 880 in a translatable plate 885 that rides on rollers 890, for example. The guide passageway 160 directs the instrument 110 to the capture member 165 and insertion of the instrument 110 translates the belt 235 and the plate 885. A forcing and sensing mechanism 250 may be provided on a drive pulley 240. Alternatively, a forcing and sensing mechanism may be provided within one or more of the rollers 890. The version of FIG. 25b is similar to that of 25a but with the belt 235 located below the plate 885 and the groove 880 being located on the underside of the plate 885.

Other modifications can be made without departing from the invention. For example, the interface device 105 could locate the position of the instrument 110 within the instrument receiving member 115 without capturing the instrument 110, for example by electromagnetic position detection or by detecting forces or acceleration of the instrument 110 or within the instrument receiving member 115. Alternatively, the interface device 105 could detect the position of a part of the instrument 110 that is not inserted through the orifice 120. In another alternative, the interface device 105 could detect the position of a users hand, such as by means of a laser tracking system.

Additionally, the capture mechanisms may be implemented other devices, such as a collet, chuck, quick connect, or quick-disconnect type devices that enable transmission of force and torque. The capture mechanism may utilize mechanical, magnetic (e.g., solenoid and plunger), air pressure, or other devices to effect capture. The automatic capture mechanism may utilize sensors and computer control to sense when to capture and release. The capture mechanism and collet may be of any size or shape to accommodate a particular instrument. The components may be of any shape or size, may be constructed of any suitable materials, and may be arranged in any fashion within the interface devices. The belts may be constructed of any suitable material, and may be implemented by any belt, cable, rope, chain or other suitable device. The belts may be disposed in other fashions within the interface device. The pulleys may be implemented by any type of pulley, gear or other device compatible with the belt. The interface device housing, frame and components may be of any size or shape, and may be constructed of any suitable materials. The various tubes of the interface devices may be of any size, shape or length, and may be constructed of any suitable materials. It is also to be understood that the terms "upper", "lower", "top", "bottom", "side", "length", "up", "down", "front", "rear", "back", "clockwise" and "counter-clockwise" are used herein merely to describe points of reference and do not limit the present invention to any specific configuration or orientation.

Although the present invention has been described in considerable detail with regard to certain preferred versions thereof, other versions are possible, as discussed above. Thus, alterations, permutations and equivalents will become apparent to those skilled in the art upon a reading of the specification and study of the drawings. Also, the various features of the embodiments herein can be combined in various ways to provide additional embodiments of the present invention. Furthermore, certain terminology has been used for the purposes of descriptive clarity, and not to limit the present invention. Therefore, the appended claims should not be limited to the description of the preferred versions contained herein and should include all such alterations, permutations, and equivalents as fall within the true spirit and scope of the present invention.

What is claimed is:

1. An apparatus, comprising:
    an instrument-receiving member defining an orifice and configured to receive an instrument having a distal end portion;
    a capture mechanism disposed within the instrument-receiving member, the capture mechanism configured to releasably engage the distal end portion of the instrument and to move in an arcuate path of the instrument-receiving member, the instrument configured to slidably move along the arcuate path of the instrument receiving member, wherein the capture mechanism includes a shaft, the shaft coupled to the sensor, the sensor configured to detect a rotational motion of the shaft; and
    a sensor configured to detect a position of the instrument and output a position signal responsive to the position of the instrument.

2. The apparatus of claim 1, further comprising:
    an actuator coupled to the instrument-receiving member and configured to provide force feedback to the instrument-receiving member responsive to the position signal.

3. The apparatus of claim 1, wherein the instrument-receiving member is configured to allow the instrument to be selectively inserted and removed therefrom.

4. The apparatus of claim 1, wherein the sensor is configured to send the position signal to a medical simulation system associated with a simulation of a medical procedure.

5. The apparatus of claim 1, wherein the sensor is configured to send the position signal to a medical simulation system associated with a simulation of an endoscopic procedure.

6. The apparatus of claim 1, wherein the capture mechanism includes a bendable shaft.

7. The apparatus of claim 1, further comprising:
    an actuator configured to apply force feedback to the capture mechanism when the instrument is engaged by the capture mechanism.

8. The apparatus of claim 1, further comprising:
    a wheel coupled to the capture mechanism and configured to rotate, the arcuate path defined by rotation of the wheel.

9. The apparatus of claim 1, further comprising:
    a wheel coupled to the capture mechanism and configured to rotate, rotation of the wheel defining the arcuate path;
    a groove disposed in the wheel; and
    a belt configured to cover the groove of the wheel.

10. The apparatus of claim 1, further comprising:
    a wheel configured to rotate, rotation of the wheel defining the arcuate path; and
    a belt configured to drivingly engage the wheel.

11. The apparatus of claim 1, further comprising:
    a wheel configured to rotate, rotation of the wheel defining the arcuate path;
    a belt configured to drivingly engage the wheel; and
    an actuator coupled to the belt and configured to apply force feedback to the instrument.

* * * * *